(12) United States Patent
Yamamoto et al.

(10) Patent No.: US 8,491,383 B2
(45) Date of Patent: Jul. 23, 2013

(54) STORAGE MEDIUM, GAME APPARATUS, GAME SYSTEM AND GAME CONTROLLING METHOD

(75) Inventors: Mai Yamamoto, Tokyo (JP); Yoshinobu Iimura, Tokyo (JP); Kento Sakai, Tokyo (JP); Takuro Mizobe, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/106,445

(22) Filed: May 12, 2011

(65) Prior Publication Data

US 2012/0225716 A1 Sep. 6, 2012

(30) Foreign Application Priority Data

Mar. 3, 2011 (JP) ................................. 2011-046678

(51) Int. Cl.
*A63F 13/00* (2006.01)
(52) U.S. Cl.
USPC ............................................. 463/31; 463/43
(58) Field of Classification Search
USPC ..................................................... 463/31–43
See application file for complete search history.

(56) References Cited

U.S. PATENT DOCUMENTS

| | | | | |
|---|---|---|---|---|
| 2005/0245313 | A1* | 11/2005 | Yoshino et al. | 463/30 |
| 2006/0100021 | A1* | 5/2006 | Yoshino et al. | 463/45 |
| 2008/0062625 | A1* | 3/2008 | Batio | 361/680 |
| 2008/0113793 | A1* | 5/2008 | Miyamoto et al. | 463/31 |
| 2009/0305783 | A1* | 12/2009 | Yoshino et al. | 463/31 |
| 2009/0305792 | A1* | 12/2009 | Yoshino et al. | 463/44 |
| 2009/0312102 | A1* | 12/2009 | Oberg et al. | 463/37 |
| 2011/0084893 | A1* | 4/2011 | Lee et al. | 345/6 |

FOREIGN PATENT DOCUMENTS

WO WO 2005/091117 9/2005

\* cited by examiner

*Primary Examiner* — Masud Ahmed
(74) *Attorney, Agent, or Firm* — Nixon & Vanderhye, P.C.

(57) ABSTRACT

A game apparatus includes a first LCD and a second LCD, and game screens are displayed on the two LCDs. On the lower screen displayed on the second LCD, a first player object is moved according to a touch operation. In response thereto, on the upper screen displayed on the first LCD, the second player object is moved to be in symmetric relation to the first player object with respect to a point. Furthermore, when an upward flipping operation is performed, the two objects are interchanged. Thereupon, the second player object is moved in accordance with a touch operation, and according thereto, the first player object is moved so as to be a symmetric relation to the second player object with respect to a point.

27 Claims, 19 Drawing Sheets

(A) TOP SIDE VIEW (FOLDED STATE)

(B) LEFT SIDE VIEW (FOLDED STATE)

STORAGE MEDIUM, GAME APPARATUS, GAME SYSTEM AND GAME CONTROLLING METHOD

CROSS REFERENCE OF RELATED APPLICATION

The disclosure of Japanese Patent Application No. 2011-046678 filed on Mar. 3, 2011 is incorporated herein by reference.

BACKGROUND

1. Field

Example embodiments of the present invention relate to a storage medium, a game apparatus, a game system and a game controlling method. More specifically, example embodiments of the present invention relate to a storage medium, a game apparatus, a game system and a game controlling method displaying screens of a virtual game on two display areas.

2. Description of the Related Art

One example of a game apparatus of the related art is disclosed in WO2005/091117 [G06F 3/048, G06F 3/14] (document 1) laid-open on Sep. 29, 2005. In the information processing apparatus of the document 1, on a first display region, a plurality of windows are displayed to be overlapped, or only the top window is displayed, and on a second display region, a plurality of tabs corresponding to the plurality of windows are displayed. When it is determined that a predetermined input is performed on the tab, the window displayed on the top of the first display region corresponding to this tub is displayed on the second display region. Alternatively, an inactive window corresponding to this tab is displayed on the second display region. Accordingly, a user performs an operation on the window displayed on the second display region with a touch panel to thereby make an input.

However, in the information processing apparatus disclosed in the document 1, in a case that an operation is performed on a desired window to make an input, this window is required to be displayed on the second display region allowing an operation with the touch panel. Accordingly, in a case that a game is played by using the information processing apparatus in the document 1, the desired window is required to be moved to the second display region, making an operation bother. Furthermore, this may impose a restriction on production of the game and game playing.

SUMMARY

Therefore, example embodiments of the present invention provide a novel storage medium, a novel game apparatus, a novel game system and a novel game controlling method.

Furthermore, example embodiments of the present invention provide a storage medium, a game apparatus, a game system and a game controlling method capable of improving operability.

A first invention is a storage medium storing a game program of a game apparatus having two display areas, the game program causes a computer of a game apparatus to function as an operation detector, a displayer, a first object controller, and an interchanger. The operation detector detects an operation by a player. The displayer displays a first object on the one display area. The first object controller moves the first object on the basis of a detection result by the operation detector. The interchanger displays the first object displayed on the one display area on the other display area on the basis of a detection result by the operation detector. Accordingly, the first object controller moves the first object displayed on the one display area or the other display area.

According to the first invention, irrespective of which display area the object is displayed out of the two display areas, the object is moved according to an operation by the player, and therefore, and it has no restriction, such as necessity to display the object in a specific display area, capable of improving operability.

A second invention is according to the first invention, and the game program causes a computer to further function as a second object controller. The second object controller moves a second object different from the first object in accordance with a movement of the first object moved by the first object controller. The displayer displays the second object on the other display area. The interchanger displays the first object on the other display area and the second object on the one display area by interchanging the first object and the second object on the basis of a detection result by the operation detector.

According to the second invention, according to a movement of the first object, the second object is moved, and therefore, it is possible to simultaneously move the two objects. In this case as well, it is possible to improve operability.

A third invention is according to the second invention, wherein the second object controller moves the second object according to an operation by the player, and the first object controller moves the first object according to the movement of the second object when the first object and the second object are interchanged by the interchanger.

In the third invention as well, similar to the second invention, it is possible to simultaneously move the two objects.

A fourth invention is according to the second invention, wherein the second object controller point-symmetrically moves the second object together with the first object moved by the first object controller. That is, the first object and the second object are moved to an inverse direction from side to side and up and down, for example.

According to the fourth invention, the second object is point-symmetrically moved, and therefore, this makes a difficulty level of the operation relatively high, and it is possible to prevent the player from being fed up with the game as much as possible.

A fifth invention is a storage medium storing a game program of a game apparatus having two display areas, and the game program causes a computer of a game apparatus to function as an operation detector, a first object controller, and a second object controller. The operation detector detects an operation by a player. The first object controller moves a first object displayed on the one display area on the basis of a detection result by the operation detector. The second object controller moves a second object different from the first object displayed on the other display area in accordance with a movement of the first object by the first object controller.

According to the fifth invention, by operating the first object displayed on one display area and moving the same, the second object displayed on the other display area is moved according thereto, and therefore, it is possible to simultaneously move the two objects. That is, the two objects can be controlled with a single operation, capable of improving operability.

A sixth invention is according to the fifth invention, wherein the second object controller point-symmetrically moves the second object together with the first object moved by the first object controller.

According to the sixth invention as well, similar to the fourth invention, the second object is point-symmetrically moved, and therefore, it is possible to prevent the player from being fed up with the game as much as possible.

A seventh invention is according to the sixth invention, and the game program causes a computer to further function as an interchanger. The interchanger displays the first object on the other display area and displays the second object on the one display area by interchanging the first object and the second object on the basis of a detection result by the operation detector. The second object controller moves the second object according to an operation by the player, and the first object controller moves the first object according to the movement of the second object when the first object and the second object are interchanged by the interchanger.

According to the seventh invention, even if the first object and the second object are interchanged, it is possible to simultaneously move the two objects.

An eighth invention is a storage medium storing a game program of a game apparatus having two display areas, and the game program causes a computer of the game apparatus to function as an operation detector and an object controller. The operation detector detects an operation by a player on the one display area. The object controller moves the object displayed on the other display area so as to be in symmetric relation to a point on the one display area detected by the operation detector, that is, a position operated by the player with respect to the reference point.

According to the eighth invention, the object displayed on the other display area is moved so as to be in symmetric relation to the position operated by the player on the one display area with respect to the reference point, and therefore, it is possible to relatively heighten the difficulty level of the operation, and prevent the player from being fed up with the game as much as possible.

A ninth invention is a game apparatus having two display areas, comprising an operation detector, a displayer, an object controller, and an interchanger. The operation detector detects an operation by a player. The displayer displays an object on the one display area. The object controller moves the object on the basis of a detection result by the operation detector. The interchanger displays the object displayed on the one display area on the other display area on the basis of a detection result by the operation detector.

In the ninth invention as well, similar to the first invention, it is possible to improve operability.

A tenth invention is a game apparatus having two display areas, comprising an operation detector, a first object controller, and a second object controller. The operation detector detects an operation by a player. The first object controller moves a first object displayed on the one display area on the basis of a detection result by the operation detector. The second object controller moves a second object different from the first object displayed on the other display area in accordance with the movement of the first object by the first object controller.

In the tenth invention as well, similar to the fifth invention, it is possible to improve operability.

An eleventh invention is a game apparatus having two display areas, comprising an operation detector and an object controller. The operation detector detects an operation by a player on the one display area. The object controller moves an object displayed on the other display area so as to be in symmetric relation to a point on the one display area detected by the operation detector with respect to the reference point.

In the eleventh invention as well, similar to the eighth invention, it is possible to prevent the player from being fed up with the game as much as possible.

A twelfth invention is a game system having two display areas, comprising an operation detector, a displayer, an object controller, and an interchanger. The operation detector detects an operation by a player. The displayer displays an object on the one display area. The object controller moves the object on the basis of a detection result by the operation detector. The interchanger displays the object displayed on the one display area on the other display area on the basis of a detection result by the operation detector.

In the twelfth invention as well, similar to the first invention, it is possible to improve operability.

A thirteenth invention is a game system having two display areas, comprising an operation detector, a first object controller, and a second object controller. The operation detector detects an operation by a player. The first object controller moves a first object displayed on the one display area on the basis of a detection result by the operation detector. The second object controller moves a second object different from the first object displayed on the other display area in accordance with the movement of the first object by the first object controller.

In the thirteenth invention as well, similar to the fifth invention, it is possible to improve operability.

A fourteenth invention is a game system having two display areas, comprising an operation detector and an object controller. The operation detector detects an operation by a player on the one display area. The object controller moves an object displayed on the other display area so as to be in symmetric relation to a point on the one display area detected by the operation detector with respect to the reference point.

In the fourteenth invention as well, similar to the eighth invention, it is possible to prevent the player from being fed up with the game as much as possible.

A fifteenth invention is a game controlling method of a game apparatus having two display areas, including following steps of: (a) detecting an operation by a player; (b) displaying an object on the one display area; (c) moving the object on the basis of a detection result by the step (a); and (d) displaying the object displayed on the one display area on the other display area on the basis of a detection result by the step (a).

According to the fifteenth invention as well, similar to the first invention, it is possible to improve operability.

A sixteenth invention is a game controlling method of a game apparatus having two display areas, including following steps of: (a) detecting an operation by a player; (b) moving a first object displayed on the one display area on the basis of a detection result by the step (a); and (c) moving a second object different from the first object displayed on the other display area according to a movement of the first object by the step (b).

In the sixteenth invention as well, similar to the fifth invention, it is possible to improve operability.

A seventeenth invention is a game controlling method of a game apparatus having two display areas, including following steps of (a) detecting an operation by a player on the one display area; and (b) moving an object displayed on the other display area so as to be in symmetric relation to a point on the one display area detected by the step (a) with respect to the reference point.

According to the seventeenth invention as well, similar to the eighth invention, it is possible to prevent the player from being fed up with the game as much as possible.

The above described features, aspects and advantages of example embodiments of the present invention will become more apparent from the following detailed description of example embodiments of the present invention when taken in conjunction with the accompanying drawings.

DETAILED DESCRIPTION OF THE EXAMPLE EMBODIMENTS

Figure 1:
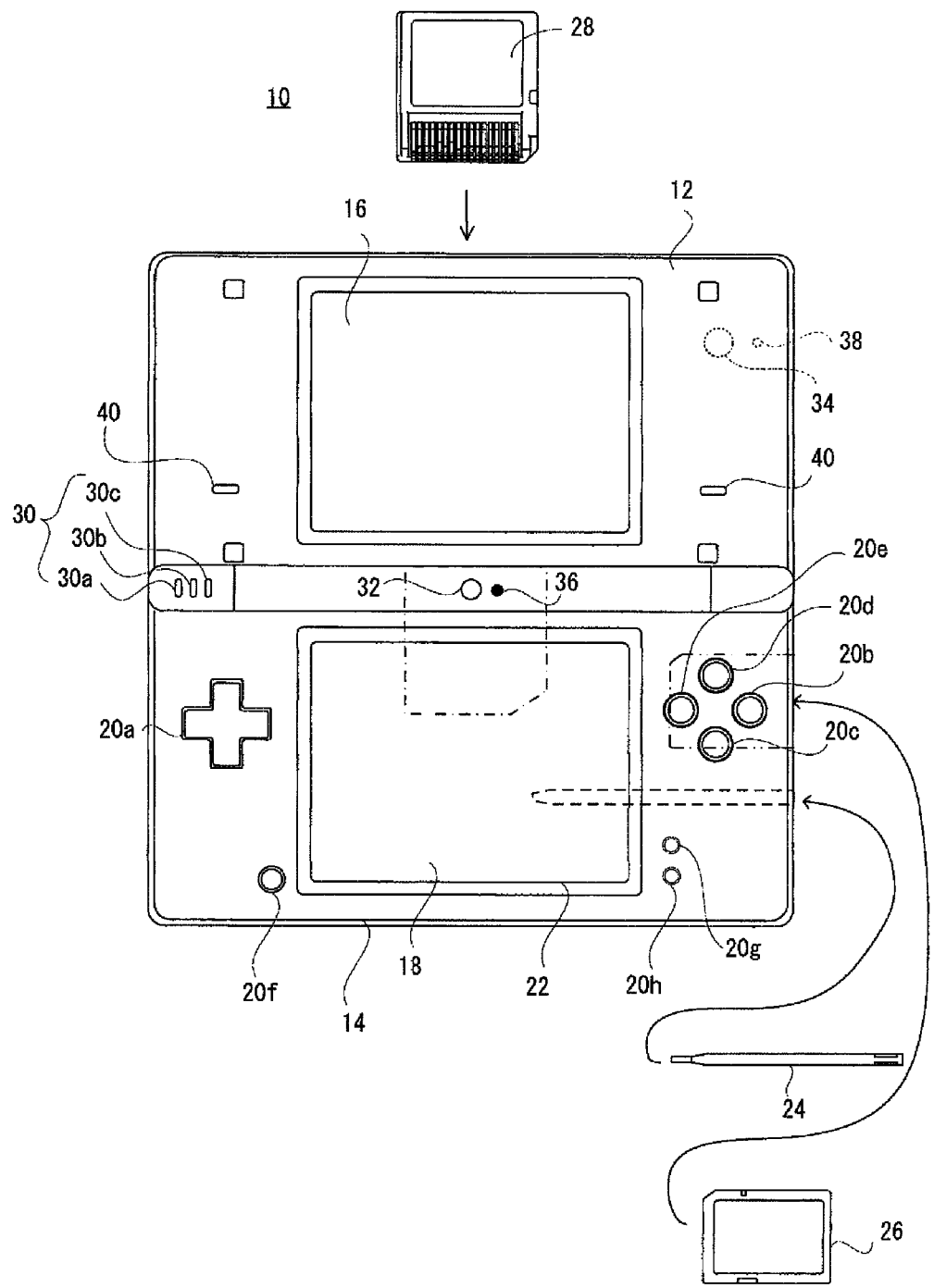
FIG. 1 is an illustrative view showing an external configuration of a game apparatus of an example embodiment of the present invention.

Referring to FIG. 1, a game apparatus 10 of one embodiment of the present invention includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding handheld game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second. LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second. LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

Figure 2:
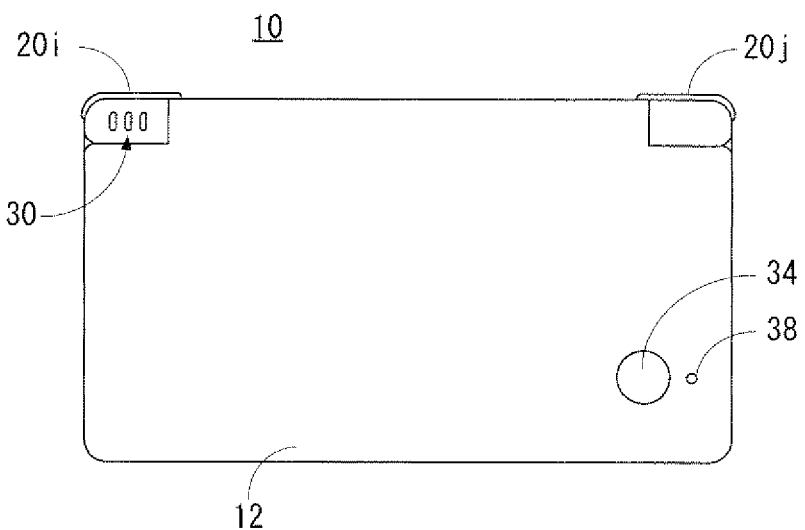
FIG. 2(A) shows a top surface of the game apparatus in a closed state.
FIG. 2(B) shows a left side surface thereof in the closed state.
Figure 2:
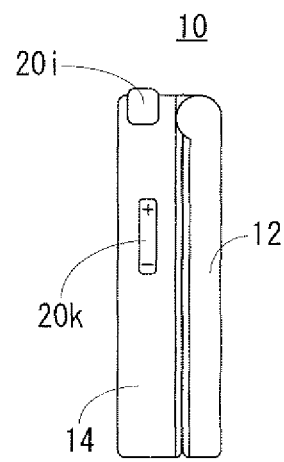

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second. LCD 18 of the lower housing 14 is set. More specifically, the direction input button 20a and the power button 20f are arranged at the left of the second. LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape (including other users, for example) as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Additionally, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LET) 38 stays lit up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image, and the first LCD 16 as a displayer for mainly displaying the imaged image and a game screen. On the other hand, the lower housing 14 is provided with the input device (operation button 20 (20*a*-20*k*) and the touch panel 22) for performing an operation input to the game apparatus 10 and the second LCD 18 as a displayer for mainly displaying an operation screen and a game screen. Accordingly, the game apparatus 10 has two screens (16, 18) and two kinds of operating portions (20, 22).

Figure 3:
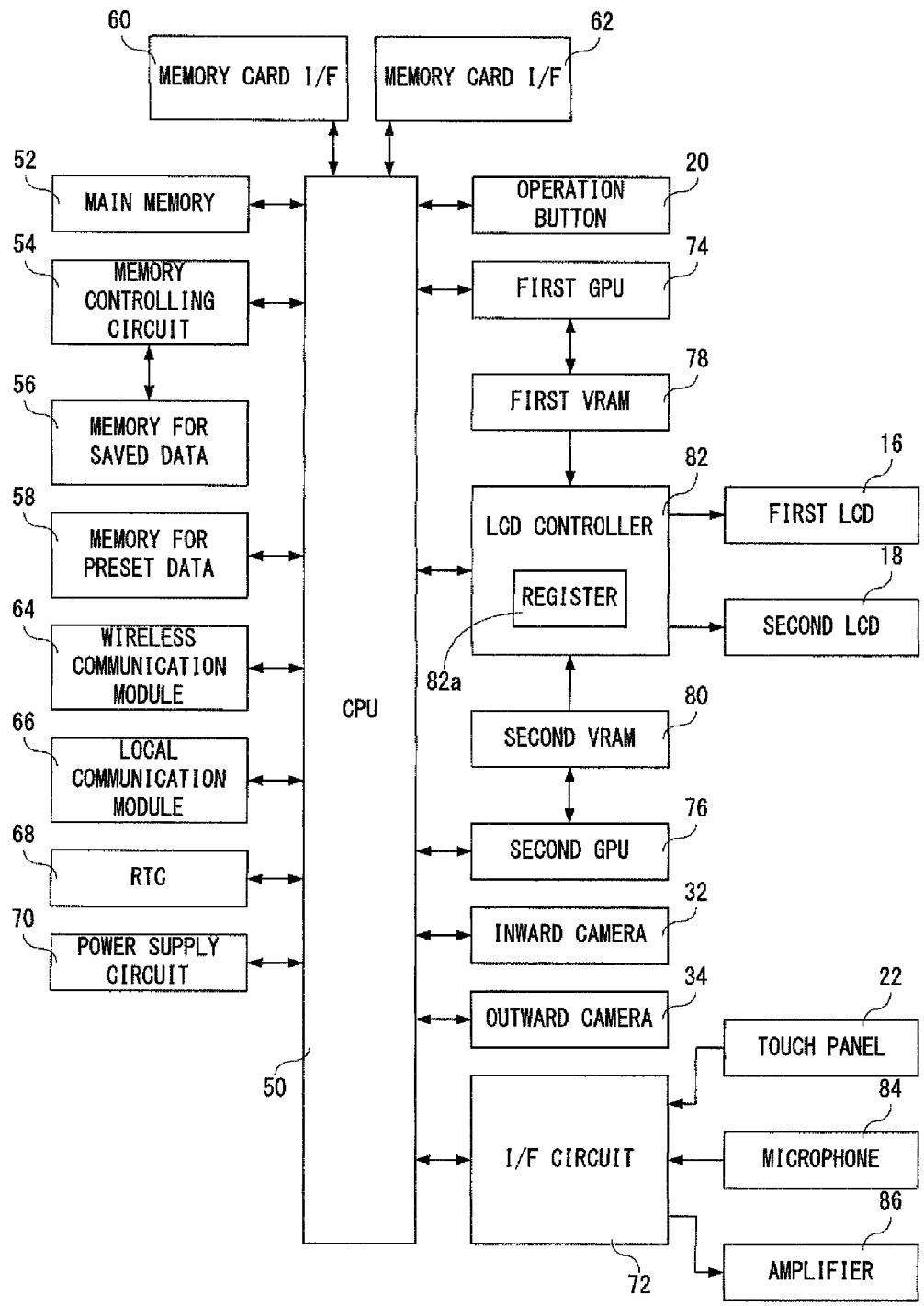
FIG. 3 is a block diagram showing an electric configuration of the game apparatus shown in FIG. 1 and FIG. 2.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real time clock (RTC) 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing (game processing) described later by executing the predetermined program.

Here, the program to be executed by the CPU 50 may previously be stored in the memory within the game apparatus 10, acquired from the memory card 26 and/or 28, and acquired from another appliance by communicating with the other appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of images imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the images imaged by the inward camera 32 and the outward camera 34 and image data received from other devices are written to the memory card 26, and the image data stored in the memory card 26 is read from the memory card 26 and stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE 802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with an RTC 68 and a power supply circuit 70. The RTC 68 counts a time and outputs the same to the CPU 50. For example, the CPU 50 can calculate a date and a current time, etc. on the basis of the time counted by the RTC 68. The power supply circuit 70 controls electric power supplied from a power source (typically battery housed in the lower housing 14) of the game apparatus 10, and supplies the electric power to respective components of the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, the touch position data is data indicating coordinates of a position where an input is performed (touched position) on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20a-20k, and is connected to the CPU 50. The operation data indicating an input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

Figure 4:
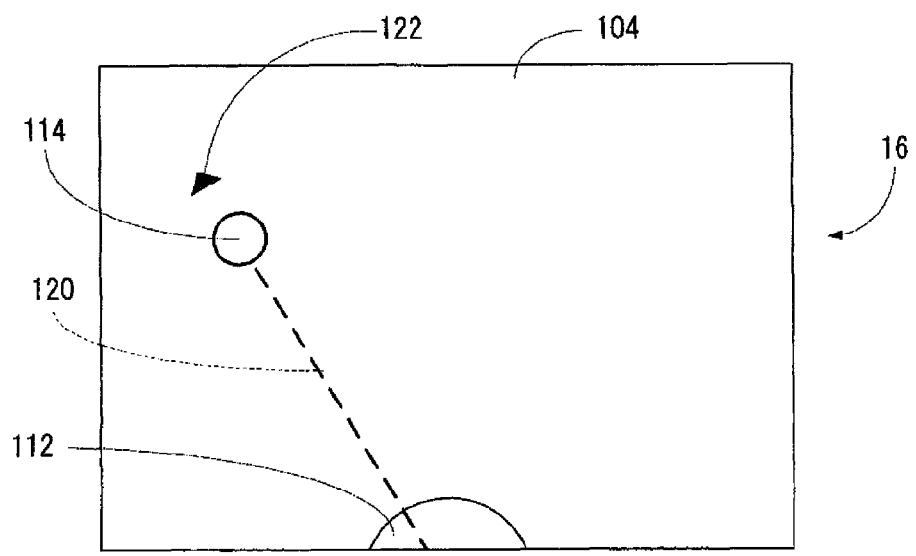
FIG. 4 is an illustrative view showing a first example of game screens to be displayed on a first LCD and a second LCD of the game apparatus shown in FIG. 1.
Figure 4:
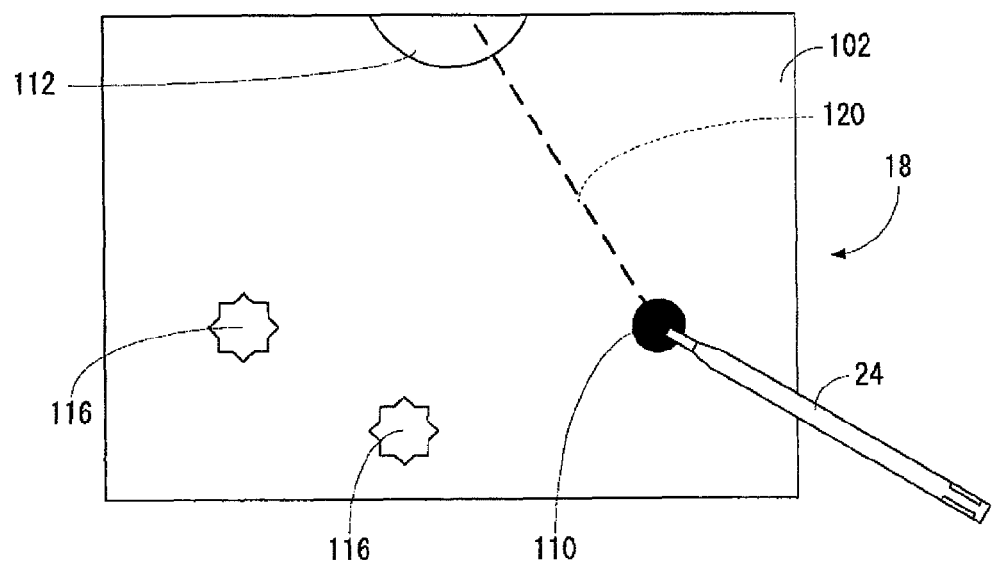

FIG. 4 shows one example of a game screen 100 of a virtual game to be executed by the game apparatus 10 as described above. As shown in FIG. 4, the game screen 100 is constructed of a lower screen 102 and an upper screen 104. The lower screen 102 is displayed on the second LCD 18, and the upper screen 104 is displayed on the first LCD 16. Although illustration is omitted, as described above, the touch panel 22 is provided on the second LCD 18 (lower screen 102).

On the lower screen 102, a first player object 110 imitating a black hole and an earth object 112 imitating the earth are displayed. Here, the earth object 112 is also displayed on the upper screen 104 described later, but this is a single object.

Furthermore, a line (dotted line) 120 connecting the first player object 110 and a second player object 114 is displayed on the lower screen 102 and the upper screen 104. In addition, on the lower screen 102, an enemy object 116 imitating a meteor is displayed. Here, the enemy object 116 may be displayed on the upper screen 104 as well as the lower screen 102, and may be displayed on both of the lower screen 102 and the upper screen 104.

On the upper screen 104, the above-described earth object 112 and second player object 114 imitating a white hole are displayed. Furthermore, on the upper screen 104, an image representing a direction (direction designating image) 122 is displayed near the second player object 114.

For example, in the virtual game, the enemy object 116 appears (occurs) near a periphery of the game screen 100 (game field 200 shown in FIG. 5) according to a time line decided in advance, and drawn to the earth object 112 by the gravity of the earth object 112. That is, the enemy object 116 is moved toward the earth object 112. In this embodiment, the enemy object 116 is moved toward the center of the earth object 112 at a velocity $v_e$. Here, the velocity $v_e$ changes depending on the distance from the earth object 112, or changed in accordance with a game level, etc. This holds true for a case that the enemy object 116 is moved toward the first player object 110, but the value of the velocity $v_e$ may be set to a different value as described later. When a predetermined number of enemy objects 116 (3 in this embodiment) collide with the earth object 112, the game is over.

Here, the time line is a table describing a timing of making the enemy object 116 appear, that is, a time from the start of the game (the number of frames) and a position (coordinate) on the game field 200 where it appears in correspondence with each of all the enemy objects 116. Here, the frame is a screen updating rate (1/60 sec) of the virtual game.

The player controls movements of the first player object 110 and the second player object 114 by operating the touch panel 22 (operation button 20 may be possible). Then, the enemy object 116 is wiped out by making the first player object 110 inhale the enemy object 116, and making a third player object 118 (see FIG. 6) generated based on the inhaled enemy object 116 collide with the enemy object 116 to destroy it. Before a predetermined number of enemy objects 116 collide with the earth object 112, all the enemy objects 116 are wiped out, the game is cleared. Here, the total number of enemy objects 116 is decided in advance in the above-described time line depending on the phase (stage) and the level of the virtual game.

In this embodiment, the first player object 110 inhales the enemy object 116 to thereby wipe out the enemy objects 116 from the game field 200. Furthermore, the second player object 114 cannot attack and inhale the enemy object 116, but holds a third player object 118 generated or enlarged in response to the first player object 110 inhaling the enemy object 116. The third player object 118 collides with the enemy object 116 to thereby destroy (wipe out) the enemy object 116.

For example, in a case that the player touches the touch panel 22 with the touch pen 24 (touch-on state), the first player object 110 exerts an inhaling forth. Although a description in detail is omitted, an inhaling force exerts on the enemy object 116, that is, draws the enemy object 116 within a first predetermined distance (30 dots in this embodiment) from the first player object 110 to thereby inhale the enemy object 116 within a second predetermined distance (20 dots in this embodiment) shorter than the first predetermined distance. Here, the first predetermined distance and the second predetermined distance are distances between the center of the first player object 110 and the center of the enemy object 116. In such a case, the enemy object 116 moves toward the first player object 110 at the velocity $v_e$ as described above.

Furthermore, in a case that the third player object 118 is generated (exists) in a touch-on state, it is held by the second player object 114. Accordingly, in such a case, the third player object 118 moves along with the second player object 114.

On the other hand, in a case that the player releases the touch pen 24 from the touch panel 22 (touch-off state, or touch-off operation), the first player object 110 does not exert a inhaling force. In such a case, even if the enemy object 116 exists within the first predetermined distance from the first player object 110, the enemy object 116 is not drawn by the first player object 110. Similarly, even if the enemy object 116 exists within the second predetermined distance from the first player object 110, the enemy object 116 is not inhaled in the first player object 110.

Furthermore, in a case that the third player object 118 is held by the second player object 114, when a touch-off operation is performed, the third player object 118 moves (flies) to the direction indicated by the direction designating image 122 at a velocity $v_p$ away from the second player object 114. Here, the velocity $v_p$ is described in detail later.

As described above, in the game apparatus 10 of this embodiment, the touch panel 22 is provided only on the second LCD 18, and therefore, the player touches the player object (first player object 110 in FIG. 4) displayed on the lower screen 102 by an operation with the touch panel 22 (hereinafter, referred to as "touch operation") to thereby directly move (drag) the same. That is, the player object is moved following the touched position. Thereupon, in accordance with the movement, the player object (second player object 114 in FIG. 4) displayed on the upper screen 104 is moved. In this embodiment, the player object displayed on the upper screen 104 is moved to keep in symmetric relation to the player object displayed on the lower screen 102 with respect to a point. Here, the point being the center (reference) of the point symmetry is a center point P (see FIG. 5) of the earth object 112 (game field 200). That is, by designating a position (coordinates) on the lower screen 102 by a touch operation, a position (coordinates) can be designated on the upper screen 104 as well.

Here, although installation and a detailed description are omitted, in a case that the player object (the first player object 110 in FIG. 4) is not displayed at the touched position, that is, in a case that the touched position and the player object displayed on the lower screen 102 are away from each other, when the player performs touch-on operation on the touch panel 22 by using the touch pen 24, the player object is moved in the direction of the touched position to be overlapped on the touched position. At this time, the player object may be approached at a constant velocity, or the player object may be approached at a higher velocity with the increasing distance between the touched position and the player object. Thereafter, as described above, the player object is moved following the touched position.

Furthermore, in this embodiment, as a touch panel 22, one having a resolution (detection accuracy) the same as that of the second LCD 18 is used, and therefore, by setting these coordinate systems to the same, coordinates (touched position) indicated by the coordinate data from the touch panel 22 can be used as coordinates (position) of the screen (lower screen 102, here) displayed on the second LCD 18 without change.

Figure 5:
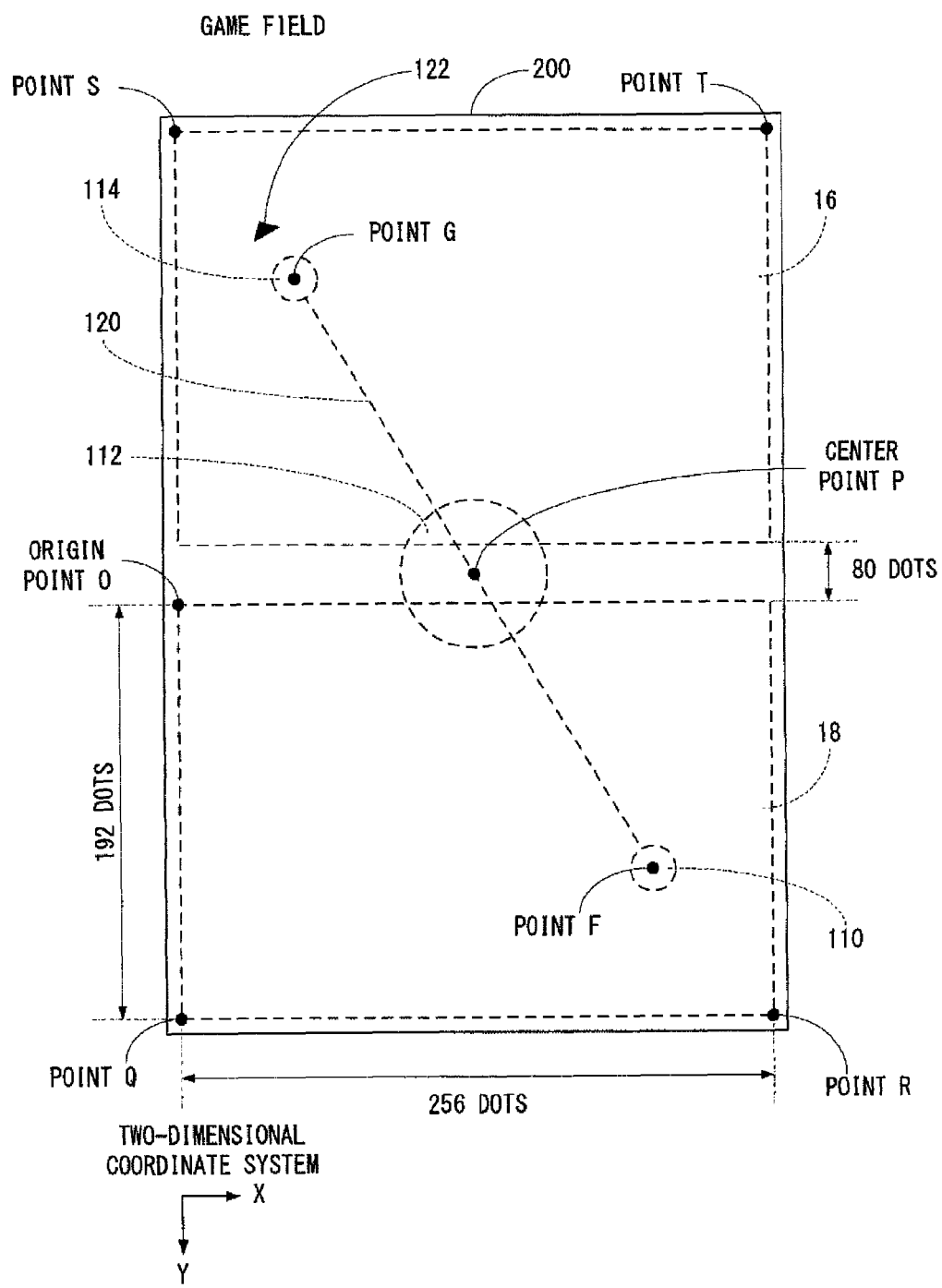
FIG. 5 is an illustrative view describing a game field of a virtual game of this embodiment.

FIG. 5 shows the game field 200 provided to a game space of the virtual game of this embodiment. The game field 200 is a vertically-long rectangular plane. In the game field 200, ranges enclosed by two quadrangle frames indicated by the dotted line correspond to a display area (upper screen 104) of the first LCD 16 and a display area (lower screen 102) of the second LCD 18. Furthermore, the area between the two quadrangle frames corresponds to a part where a hinge, etc. set between the first LCD 16 and the second LCD 18 is provided.

Here, the game field 200 shown in FIG. 5 is one example, and may be a plane the same or larger than the rectangle including at least point S, a point Q, point R and a point T as vertexes.

As shown in FIG. 5, as to a two-dimensional coordinate system of the game space, the lateral direction is an X-axis direction, and the longitudinal direction is a Y-axis direction. Moreover, the right direction is a plus direction of the X-axis, and the downward direction is a plus direction of the Y-axis. In this embodiment, a point 0 corresponding to the vertex at the upper left of the second LCD 18 is set to an origin point (0, 0). The first LCD 16 and the second LCD 18 each is 192 dots longitudinally and 256 dots laterally as described above. Accordingly, the coordinates of the point R are (256, 192). Additionally, in this embodiment, the longitudinal length of the part where the hinge, etc. is provided between the first LCD 16 and the second LCD 18 is set to 80 dots. Accordingly, the coordinates of the point S corresponding to the vertex at the upper left of the first LCD 16 are (0, −272). In addition, the coordinates of the point T corresponding to the vertex at the upper right of the first LCD 16 are (256, −272).

In this embodiment, the position of the earth object 112 is set at the center (middle) of the game field 200. Accordingly, the coordinates of the center point P of the earth object 112 are (128, −40). The positions of the first player object 110 and the second player object 114 are controlled so as to be symmetrical with respect to the center point P. More specifically, when the position (point F) of the player object (first player object 110, here) displayed on the lower screen 102 is regarded as (x, y), the position (point G) of the player object (second player object 114, here) displayed on the upper screen 104 is decided (calculated) as (−x+128, −y−40).

Figure 6:
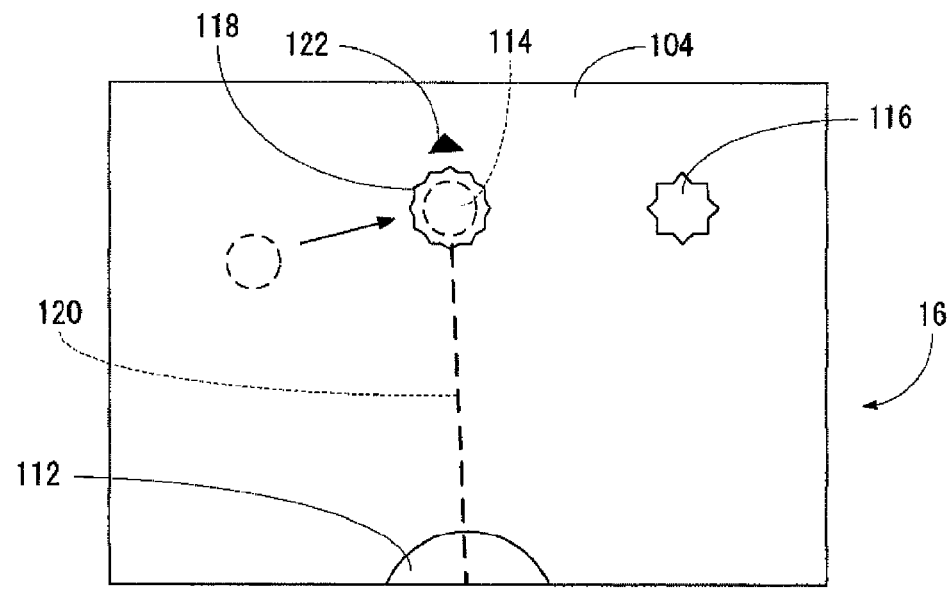
FIG. 6 is an illustrative view showing a second example of game screens to be displayed on the first LCD and the second LCD of the game apparatus shown in FIG. 1.
Figure 6:
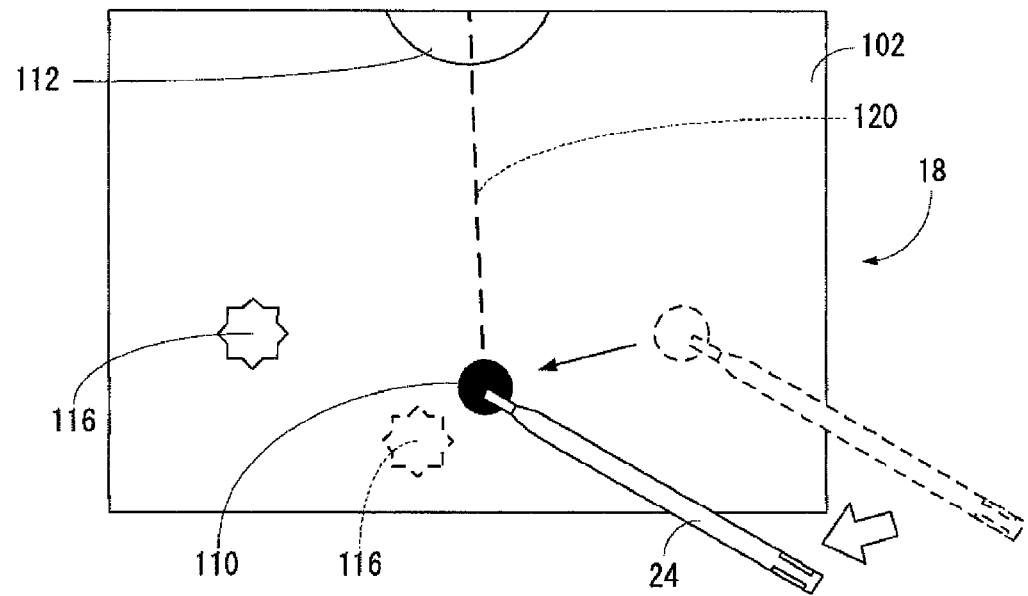

As shown in FIG. 6, when the first player object 110 is approached to the enemy object 116 to make the distance between them shorter than the second predetermined distance, the enemy object 116 is inhaled in the first player object 110. In response thereto, the third player object 118 is generated at a position superimposed on the second player object 114. As described above, in the touch-on state, the third player object 118 is moved together with the second player object 114 with superimposed (held) on the second player object 114.

Here, when the third player object 118 is held by the second player object 114, it is displayed in front of this second player object 114, and therefore, the second player object 114 is hidden under the back of the game screen 100.

When the third player object 118 collides with the enemy object 116, it destroys the enemy object 116 to wipe it out. For example, when the first player object 110 is moved as in FIG. 6 to in FIG. 7, the second player object 114 is moved to keep in symmetric relation to the first player object 110 with respect to a point, and the third player object 118 is moved together with the second player object 114. This makes it possible to make the third player object 118 collide with the enemy object 116.

It should be noted that the first player object 110 can inhale a plurality of enemy objects 116, and the third player object 118 is made large step by step in correspondence with the number of inhaled enemy objects 116. That is, every time that the first player object 110 inhales the enemy object 116, the third player object 118 grows to increase in size.

Figure 7:
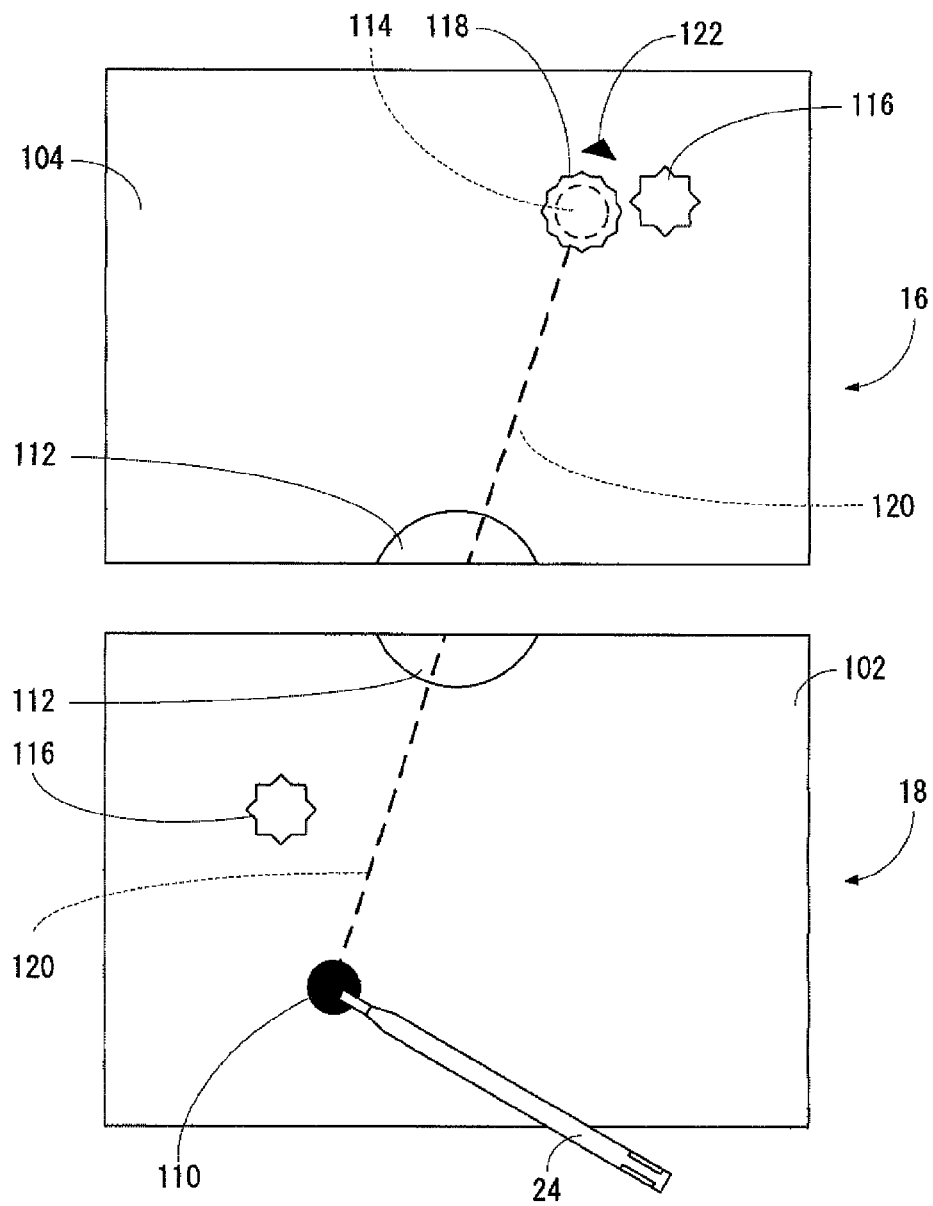
FIG. 7 is an illustrative view showing a third example of game screens to be displayed on the first LCD and the second LCD of the game apparatus shown in FIG. 1.
Figure 8:
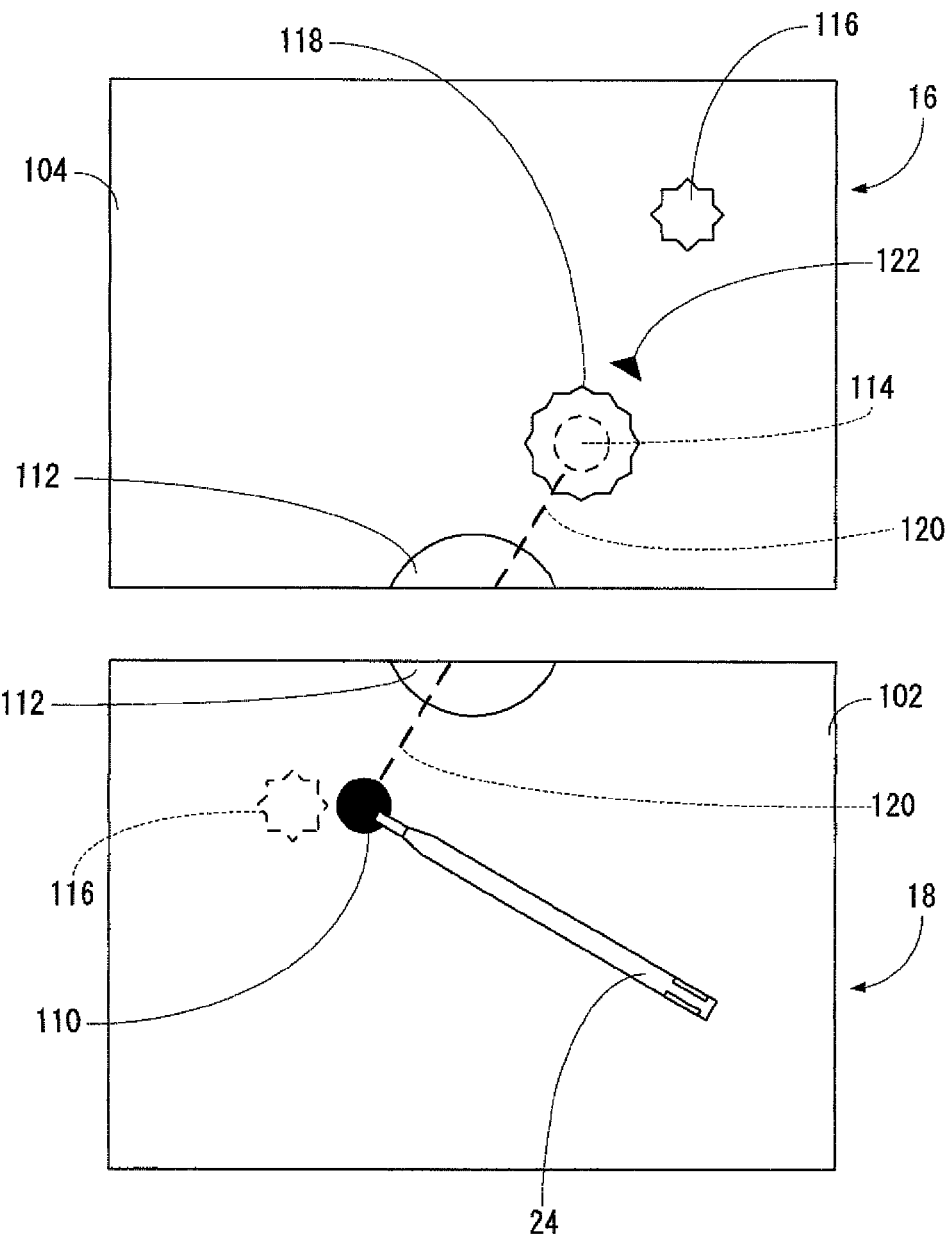
FIG. 8 is an illustrative view showing a fourth example of game screens to be displayed on the first LCD and the second LCD of the game apparatus shown in FIG. 1.

For example, as in FIG. 6 to FIG. 8, when the first player object 110 is approached to the enemy object 116 which is closer to the earth object 112 to make the distance between them shorter than the second predetermined distance, the first player object 110 inhales this enemy object 116. Accordingly, the third player object 118 is increased in size by one step.

Additionally, as shown in FIG. 7, in a case that the third player object 118 is made to collide with the enemy object 116 by moving the first player object 110, the third player object 118 decreases in size by one step every time that it collides with the enemy object 116. That is, every time that the third player object 118 collides with the enemy object 116, it is reduced by its impact. Then, when the third player object 118 collides with the enemy object 116 by the number of times the same as the number of enemy objects 116 inhaled by the first player object 110, it is wiped out.

Figure 9:
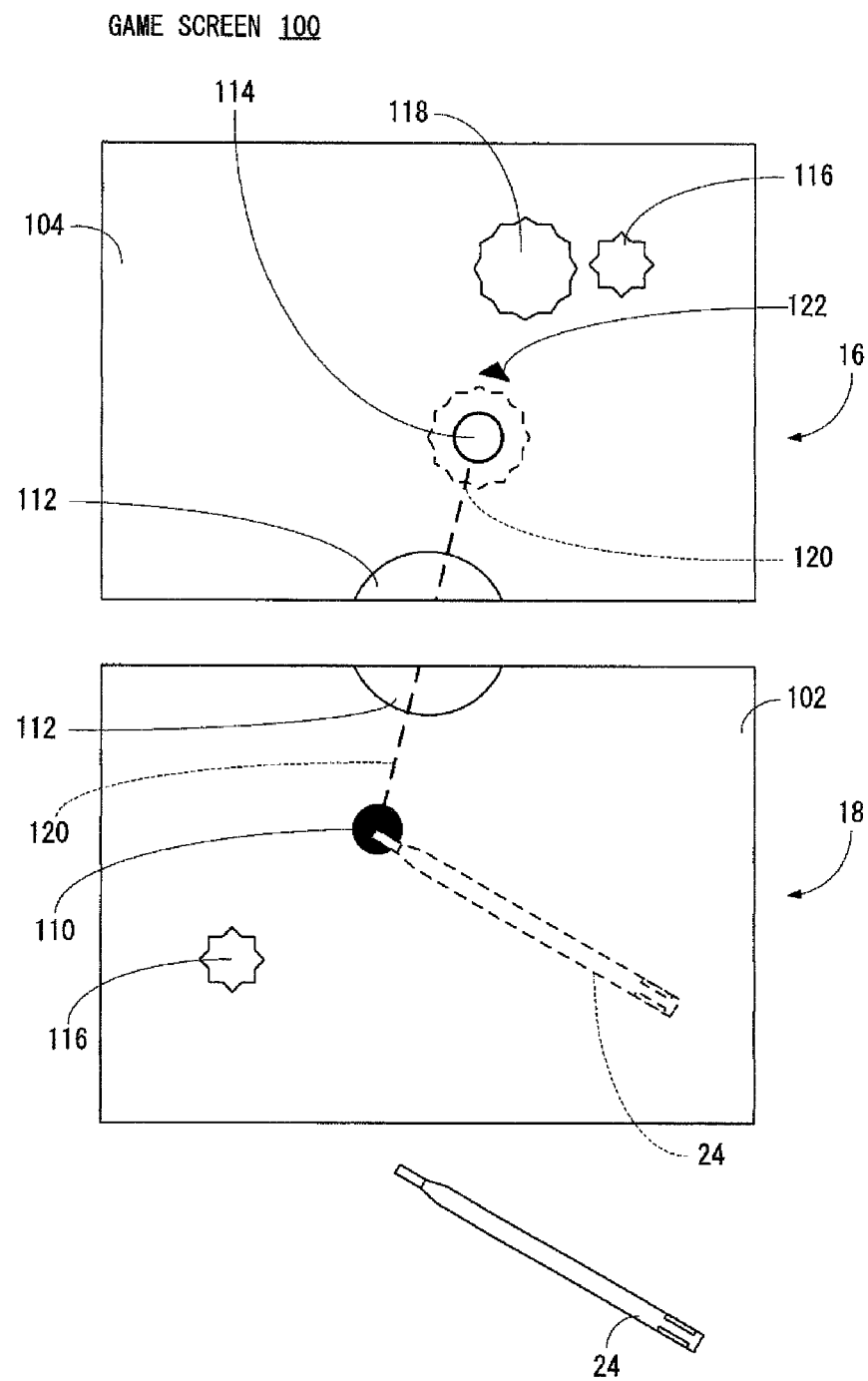
FIG. 9 is an illustrative view showing a fifth example of game screens to be displayed on the first LCD and the second LCD of the game apparatus shown in FIG. 1.

Furthermore, as shown in FIG. 9, in a case that the third player object 118 is generated (exists), when the player performs a touch-off operation, the third player object 118 starts to move (fly) toward the direction indicated by the direction designating image 122 away from the second player object 114 as described above. The third player object 118 flies straight at the velocity $v_p$ to move outside the game screen 100 (game space). That is, the third player object 118 flies in a direction from the first player object 110 to the second player object 114 at the velocity $v_p$ on the straight line 12.

When the third player object 118 collides with the enemy object 116 during flying, the enemy object 116 is destroyed. Here, in this embodiment, in a case that the third player object 118 collides with the enemy object 116 during flying, the size of the third player object 118 is not changed. Accordingly, the third player object 118 destroys the colliding enemy object 116 so long as it is in the game space.

Furthermore, depending on the size of the third player object 118, the velocity $v_p$ is changed. In this embodiment, as the third player object 118 is large, the velocity $v_p$ is made low to thereby make the destructive force large (retained). That is, the larger the third player object 118 is, the longer it stays in the game space. More specifically, according to equation 1, the velocity $v_p$ is decided. Here, k is a coefficient equal to or more than 1, and $v_0$ is a constant velocity. Here, k and $v_0$ are decided by developers or programmers of the virtual game. Furthermore, n is a value in relation to the size of the third player object 118 (numerical value indicating the step of the size). That is, n corresponds to the number of enemy objects 116 inhaled for generating (producing/enlarging) the third player object 118.

$$v_p = k \times v_0 / n \qquad \text{[Equation 1]}$$

Here, in this embodiment, the larger the third player object 118 is, the lower the velocity $v_p$ is, but the higher the velocity $v_p$ may be.

Figure 10:
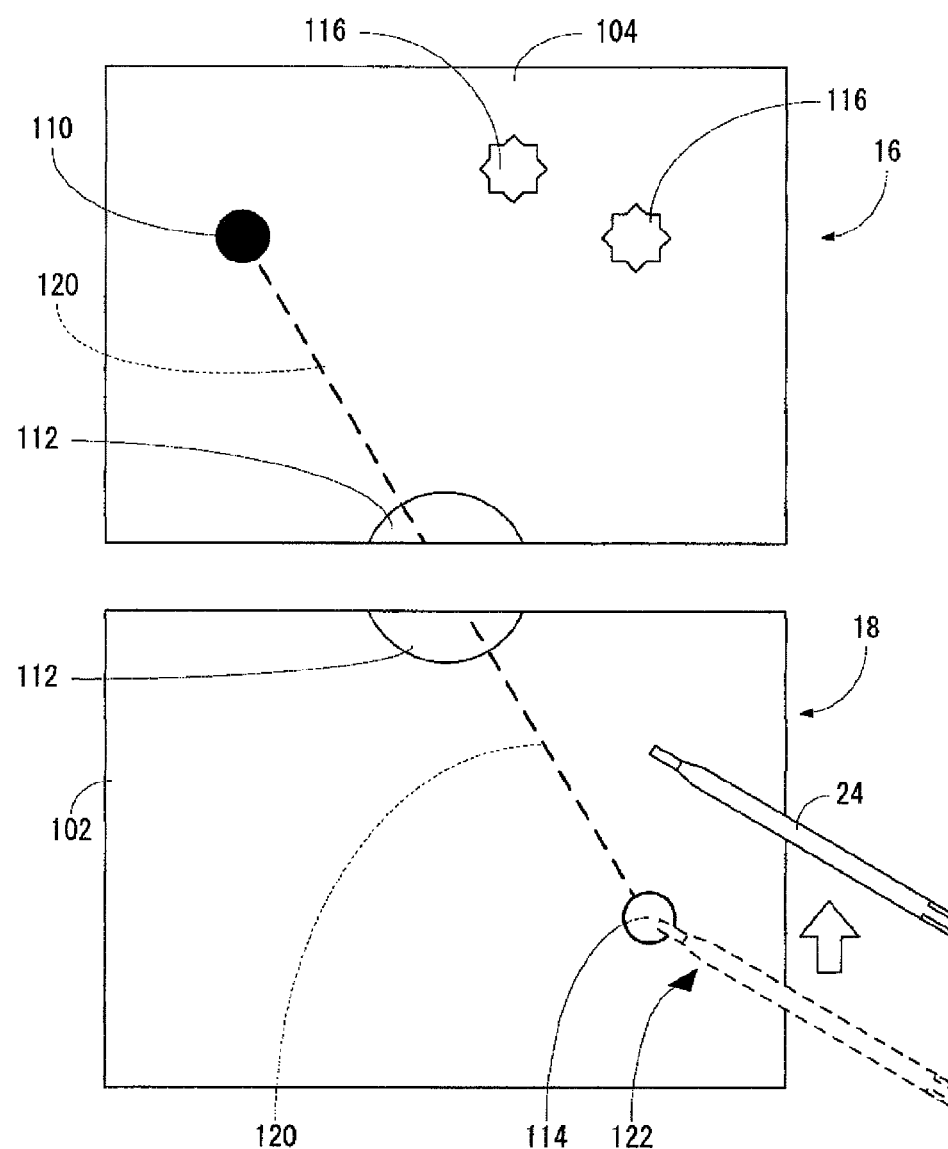
FIG. 10 is an illustrative view showing a sixth example of game screens to be displayed on the first LCD and the second LCD of the game apparatus shown in FIG. 1.

Furthermore, when the player performs an upward flipping operation by using the touch pen 24 on the touch panel 22, the first player object 110 and the second player object 114 can be interchanged. For example, when the player performs an upward flipping operation in the positional relationship shown in FIG. 4, the first player object 110 is displayed on the upper screen 104, and the second player object 114 is displayed on the lower screen 102 as shown in FIG. 10. Here, the first player object 110 and the second player object 114 are displayed at the each other's positions before being interchanged.

Moreover, in a case that an upward flipping operation is performed, an operation of flipping the player object displayed on the lower screen 102 (first player object 110 in FIG. 4) need not be performed, and a flipping operation may be performed in any position on the lower screen 102.

Furthermore, when an upward flipping operation is performed (toward the first LCD 16) in a state the second player object 114 is in the lower screen 102 and the first player object 110 is in the upper screen 104 as shown in FIG. 10, the first player object 110 and the second player object 114 are interchanged. That is, the positional relationship shown in FIG. 4 is satisfied.

Here, whether an upward flipping is performed or not is dependent on the change of the coordinates in the Y-axis direction of the touched position is a third predetermined distance or more within a predetermined time. In this embodiment, in a case that the Y coordinate of the touched position changes by 3 dots or more in the minus direction during one frame, it is determined that upward (toward the first LCD 16) flipping is performed.

Thus, the reason why the first player object 110 and the second player object 114 are interchanged is that a function (role) is different between the first player object 110 and the second player object 114 as described above. For example, in a case that the enemy object 116 is on the upper screen 104, even if the second player object 114 is on the upper screen 104, if no third player object 118 occurs, the enemy object 116 cannot be wiped out. In such a case, as shown in FIG. 10, the first player object 110 is moved to the upper screen 104 to need to make the first player object 110 inhale the enemy object 116.

Here, the first player object 110 existing on the upper screen 104 moves by moving the second player object 114 existing on the lower screen 102 to keep in symmetric relation to the second player object 114 with respect to the reference point. That is, in such a case, as described by using FIG. 5, the position of the first player object 110 is decided (calculated) on the basis of the position of the second player object 114.

Although illustration is omitted, in a case that the first player object 110 inhales the enemy object 116 on the upper screen 104 as well, the third player object 118 is generated or enlarged at the position of the second player object 114 on the lower screen 102. Furthermore, on the lower screen 102, the third player object 118 follows the touched position in a touch-on state, and flies in the direction indicated by the direction designating image 122 in response to a touch off operation. Accordingly, on the lower screen 102, by making the third player object 118 collide with the enemy object 116, the enemy object 116 can be destroyed and wiped out.

Figure 11:
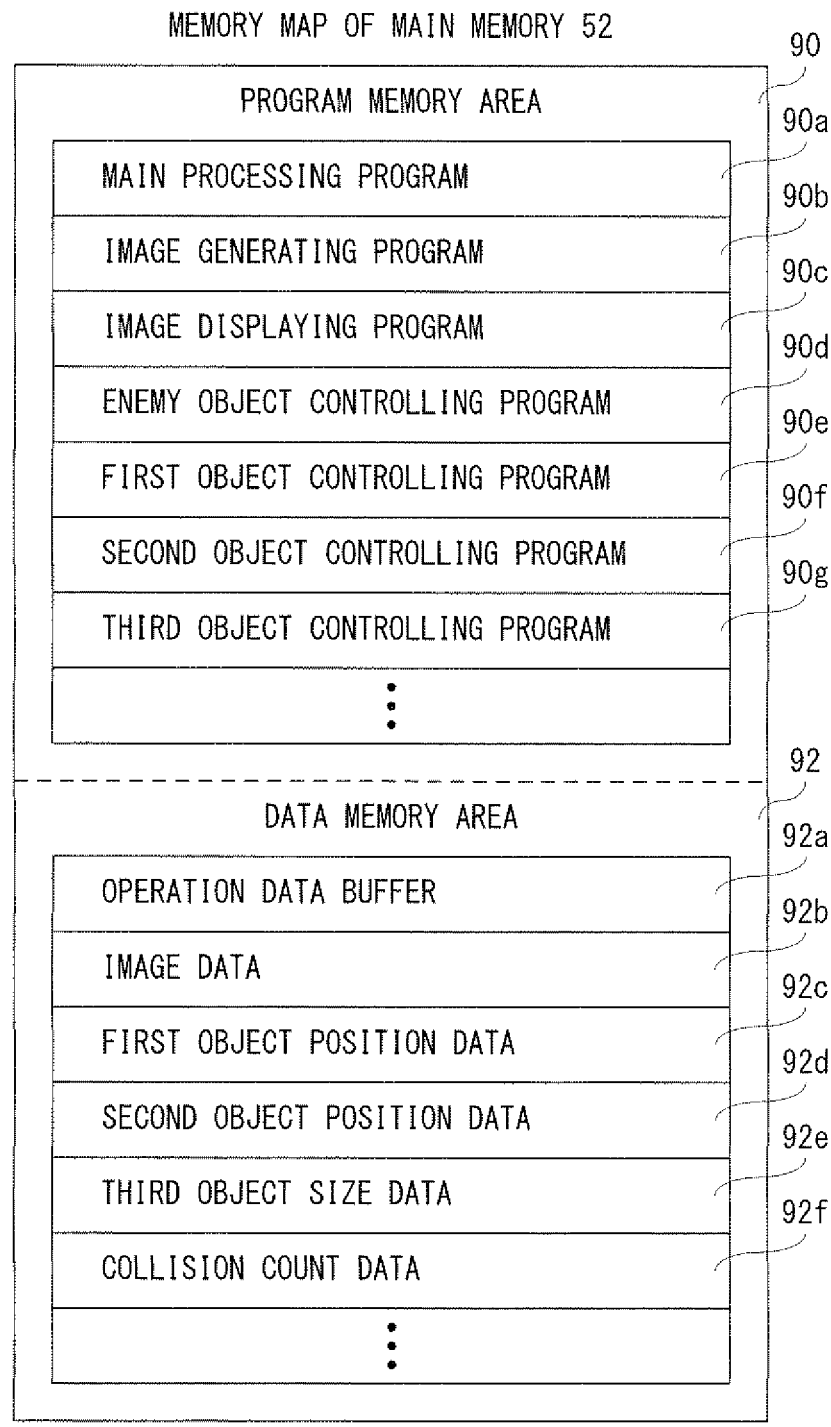
FIG. 11 is an illustrative view showing an example of a memory map of a main memory shown in FIG. 3.

FIG. 11 is an illustrative view showing a memory map of the main memory 52 shown in FIG. 3. As shown in FIG. 11, the main memory 52 includes a program memory area 90 and a data memory area 92. In the program memory area 90, a game program is stored, and the game program is constructed of a main processing program 90a, an image generating program 90b, an image displaying program 90c, an enemy object controlling program 90d, a first object controlling program 90e, a second object controlling program 90f, a third object controlling program 90g, etc.

The main processing program 90a is a program for processing a main routine of the virtual game of this embodiment. The image generating program 90b is a program for generating data of the display image (display image data) about various screens (game screen 100, etc.) by using the image data 92b described later. The image displaying program 90c is a program for displaying the display image data generated according to the image generating program 90b on the first LCD 16 and the second LCD 18.

The enemy object controlling program 90d is a program for making the enemy object 106 appear according to the time line decided in advance, and moving it toward the first player object 110 or the earth object 112 at the velocity $v_e$. Furthermore, the enemy object controlling program 90d is a program for wipe the enemy object 116 out when the enemy object 116 is inhaled in the first player object 110, or collides with the earth object 112 or the third player object 118.

The first object controlling program 90e is a program for moving the first player object 110 on the basis of an operation by the player, exerting an inhaling forth, or not exerting an inhaling forth. More specifically, the first object controlling program 90e makes the first player object 110 follow the touched position on the lower screen 102 and makes it move toward the touched position. Furthermore, the first object controlling program 90e moves on the upper screen 104 the first player object 110 to be symmetrical with respect to the center point P in accordance with the movement of the second player object 114 displayed on the lower screen 102. That is, according to the first object controlling program 90e, the first object position data 92c described later is updated. Moreover, the first object controlling program 90e exerts an inhaling forth in a touch-on state to act an inhaling forth on the enemy object 116 within the first predetermined distance, and further inhales the enemy object 116 within the second predetermined distance.

The second object controlling program 90f is a program for moving the second player object 114 based on an operation by the player. More specifically, the second object controlling program 90f makes the second player object 114 follow the touched position on the lower screen 102, or makes it move toward the touched position. Furthermore, the second object controlling program 90f moves on the upper screen 104 the second player object 114 to be symmetrical with respect the center point P in accordance with the movement of the first player object 110 displayed on the lower screen 102. That is, according to the second object controlling program 90f, the second object position data 92d described later is updated.

The third object controlling program 90g is a program for generating and enlarging the third player object 118, being held by the third player object 118 by the second player object 114, and moving (flying) the third player object 118 within the game space. More specifically, the third object controlling program 90g generates and enlarges the third player object 118 in a case that the enemy object 116 is inhaled in the first player object 110. Furthermore, the third object controlling program 90g displays the third player object 118 on the second player object 114 in a touch-on state, and makes the third player object 118 move (fly) toward the direction indicated by the direction designating image 122 at the velocity $V_p$ in response to a touch-off operation.

Although illustration is omitted, the game program includes a sound output program, a backup program, etc. The sound output program is a program for generating and outputting a sound (sound effect, melody, music) necessary for the virtual game by using the sound data not shown. The backup program is a program for storing (saving) game data (proceeding data, result data) in the memory card 26, 28 and the memory for saved data 56 according to a predetermined event and an instruction from the player.

The data memory area 92 is provided with an operation data buffer 92a. Furthermore, in the data memory area 92, image data 92b, the first object position data 92c, second object position data 92d, third object size data 92e and collision count data 92f are stored.

The operation data buffer 92a is a buffer for storing (temporarily storing) operation data from the operation button 20 and coordinate data from the touch panel 22 in chronological order. The operation data and the coordinate data temporarily stored in the operation data buffer 92a are used for the processing by the CPU 50 and then erased.

The image data 92b is image data of polygon data, texture data, etc. The first object position data 92c is data (coordinate data) of a current position of the first player object 110. The second object position data 92d is data (coordinate data) of a current position of the second player object 114. Here, the second object position data 92d may indicate a current position of the third player object 118.

The third object size data 92e is data of a value as to the size of the third player object 118. More specifically, the third object size data 92e is numerical value data as to the number of enemy objects 116 inhaled by the first player object 110 for generating and enlarging the third player object 118. The collision count data 92f is numerical value data indicating the number of times (or the number of enemy objects 116) that the enemy object 116 collides with the earth object 112.

Although illustration is omitted, in the data memory area 92, other data necessary for the virtual game is stored, or flags and counters (timers) are provided.

Figure 12:
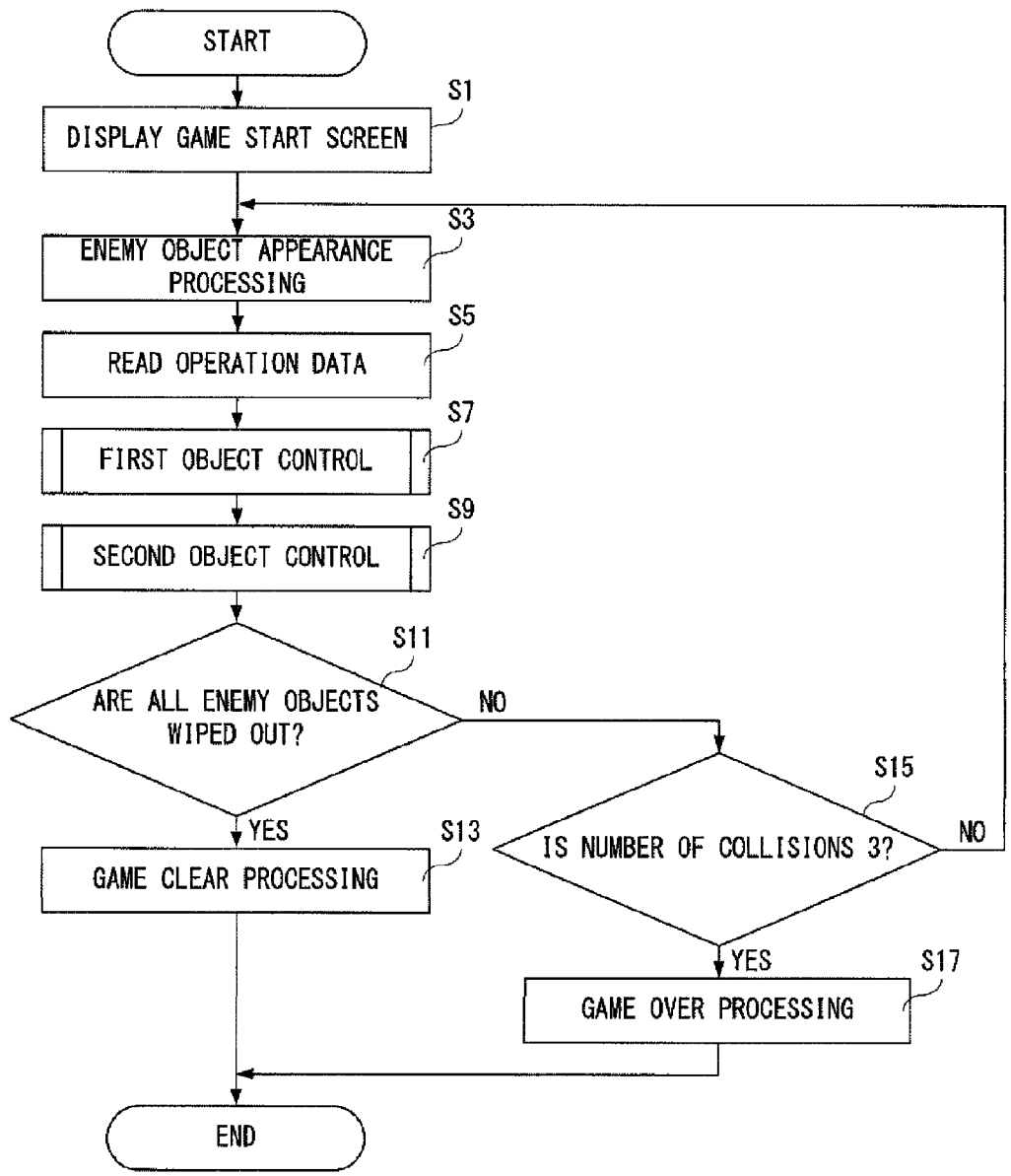
FIG. 12 is a flowchart showing entire processing by a CPU shown in FIG. 3.

FIG. 12 is a flowchart showing entire processing by the CPU 50 shown in FIG. 3. As shown in FIG. 12, the CPU 50 displays a game start screen in a step S1 when starting the entire processing. Although illustration is omitted, in the step S1, the CPU 50 displays a game screen (game start screen) in which the enemy object 116 has not yet appeared, the earth object 112 is displayed at the center, the first player object 110 is displayed at a predetermined position of the lower screen 102, and the second player object 114 is displayed so as to keep symmetric relation to the first player object 110 in the position of the upper screen 104 with respect to a point. Here, the first player object 110 may be displayed on the upper screen 104, and the second player object 114 may be displayed on the lower screen 102.

In a succeeding step S3, enemy object appearance processing is executed. Here, according to the time line decided in advance, the enemy object 116 is made its appearance to the game space (game field 200). When the enemy object 116 appears, enemy object processing (see FIG. 17 and FIG. 18) as to this enemy object 116 is executed in a task different from the entire processing.

In a next step S5, operation data is read. It should be noted that the operation data and the coordinate data are detected by other processing not shown, and the detected operation data and coordinate data are stored in the operation data buffer 92a in chronological order. Successively, first object controlling processing (see FIG. 13 and FIG. 14) described later is executed in a step S7, second object controlling processing (see FIG. 15 and FIG. 16) described later is executed in a step S9, and the process proceeds to a step S11.

In the step S11, it is determined whether or not all the enemy objects 116 are wiped out. That is, the CPU 50 determines whether or not all the enemy objects 116 decided according to the time line are wiped out in response to the first player object 110 inhaling the enemy object 116, the third player object 118 destroying the enemy object 116, and so forth.

If "YES" in the step S11, that is, if all the enemy objects 116 are wiped out, game clearing processing is executed in a step S13 to thereby end the entire processing. In the step S13, the CPU 50 displays a game screen representing a game clear, and outputs a sound (music) thereof, for example.

On the other hand, if "NO" in the step S11, that is, if the enemy object 116 stays, it is determined whether the number of collisions is 3 in a step S15. Here, the CPU 50 determines whether or not the number of collisions indicated by the collision count data 92f is 3. If "NO" in the step S15, that is, if the number of collisions is less than 3, the process returns to the step S1 as it is. On the other hand, if "YES" in the step S15, that is, if the number of collisions is 3, game over processing is executed in a step S17 to end the entire processing. In the step S17, the CPU 50 displays the game screen representing a game over and outputs sound (music) thereof, for example.

Figure 13:
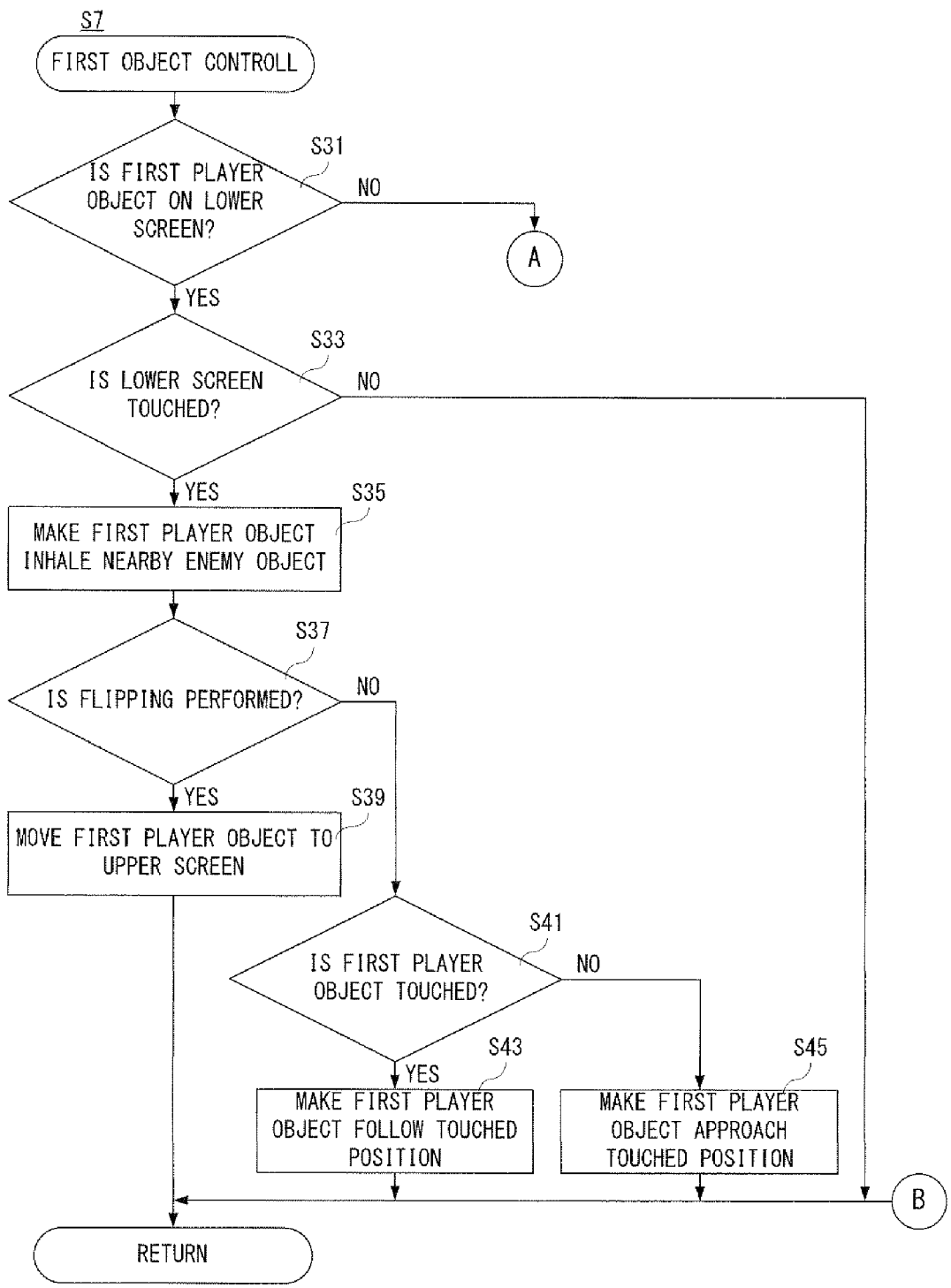
FIG. 13 is a flowchart showing one part of first object controlling processing by the CPU shown in FIG. 3.
Figure 14:
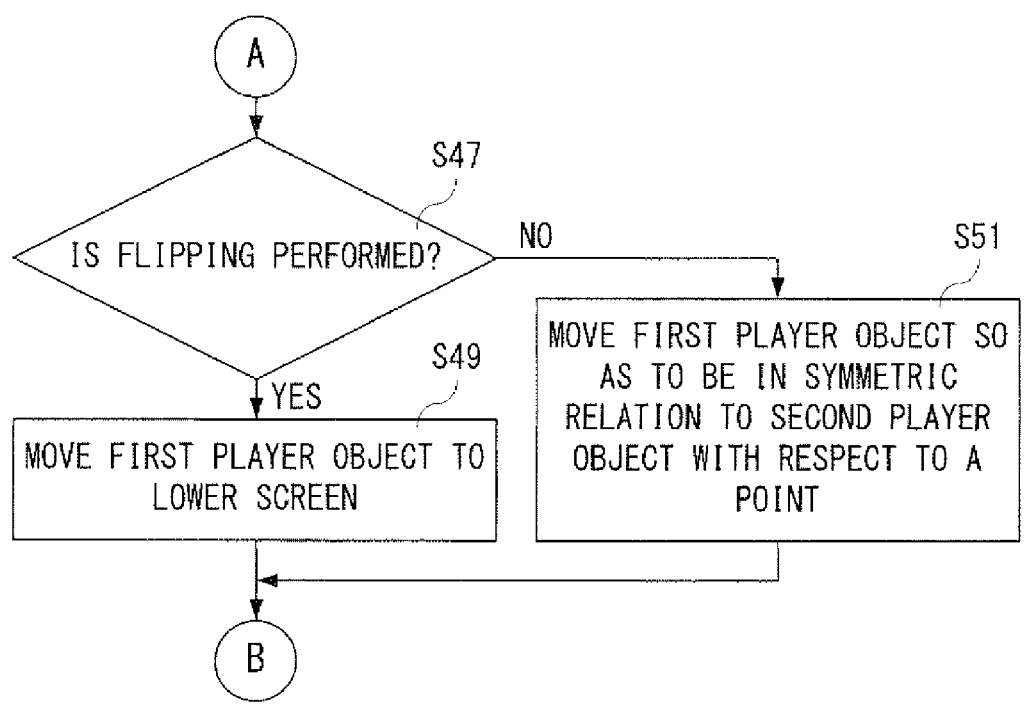
FIG. 14 is a flowchart showing the other part of the first object controlling processing by the CPU shown in FIG. 3 and sequel to FIG. 13.

FIG. 13 and FIG. 14 are flowcharts showing the first object controlling processing in the step S7 shown in FIG. 12. As shown in FIG. 13, when starting the first object controlling processing, the CPU 50 determines whether or not the first player object 110 is on the lower screen 102 in a step S31. That is, the CPU 50 determines whether or not the position of the first player object 110 indicated by the first object position data 92c is within the range of the lower screen 102 decided by the origin point 0 (0, 0) and the point R (256, 192).

If "NO" in the step S31, that is, if the first player object 110 is on the upper screen 104, the process proceeds to a step S47 shown in FIG. 14. On the other hand, if "YES" in the step S31, that is, if first player object 110 is on the lower screen 102, it is determined whether or not the lower screen 102 is touched in a step S33. Here, the CPU 50 determines whether or not the coordinate data of the current frame is stored with reference to the operation data buffer 92a.

If "NO" in the step S33, that is, if the lower screen 102 is not touched, the process returns to the entire processing shown in FIG. 12 as it is. On the other hand, if "YES" in the step S33, that is, if the lower screen 102 is touched, a nearby enemy object 116 is inhaled in a step S35, and the process proceeds to a step S37. In the step S35, under the control of the CPU 50, the first player object 110 draws the enemy object 116 within a first predetermined distance (30 dots, for example) and inhales enemy object 116 within a second predetermined distance (20 dots, for example).

In the step S37, it is determined whether or not flipping is performed. Here, the CPU 50 determines whether or not the change of the position indicated by the coordinate data during one frame is a third predetermined distance (3 dots, for example) or more in a minus direction of the Y-coordinates with reference to the operation data buffer 92a. If "YES" in the step S37, that is, if flipping is performed, the first player object 110 is moved to the upper screen 104 in a step S39, and the process returns to the entire processing.

It should be noted. FIG. 12 shows that after the first object controlling processing is executed in the step S7, the second object controlling processing is executed in the step S9, but these are executed at the same time or approximately the same time. Accordingly, in the step S39, the first object position data 92c and the second object position data 92d are copied, and then, the copy of the second object position data 92d is stored in the data memory area 92 as first object position data 92c. Furthermore, in the second object controlling processing described later, the copy of the first object position data 92c is stored in the data memory area 92 as second object position data 92d (S77). That is, the positions of the first player object 110 and the second player object 116 are interchanged. This holds true for a step S49 described later.

Furthermore, if "NO" in the step S37, that is, if flipping is not performed, it is determined whether or not the first player object 110 is touched in a step S41. That is, the CPU 50 determines whether or not the touched position indicated by the coordinate data of the current frame with reference to the operation data buffer 92a is on the first player object 110 displayed on the lower screen 102. Whether the touched position is on the first player object 110 or not is depending on whether it is within the range decided by the size of the first player object 110 regarding the position of the first player object 110 as a center.

If "YES" in the step S41, that is, if the first player object 110 is touched, the first player object 110 is made to follow the touched position in a step S43, and the process returns to the entire processing. That is, in the step S43, the CPU 50 updates the position of the first player object 110, that is, the first object position data 92c by the changed amount and in the changed direction of the touched position.

On the other hand, if "NO" in the step S41, that is, if the first player object 110 is not touched, the first player object 110 is approached to the touched position in a step S45, and then, the process returns to the entire processing. In the step S45, the CPU 50 updates the position of the first player object 110, that is, the first object position data 92c toward the touched position.

As shown in FIG. 14, in the step S47, it is determined whether or not flipping is performed. This determination processing is the same as that in the step S37. If "YES" in the step S47, that is, if flipping is performed, the first player object 110 is moved to the lower screen 102 in a step S49, and the process returns to the entire processing as shown in FIG. 13.

On the other hand, if "NO" in the step S47, that is, if flipping is not performed, the first player object 110 is moved to keep in symmetric relation to the second player object 114 with respect to a point in a step S51, and the process returns to the entire processing. That is, in the step S51, the CPU 50 calculates a position being in symmetric relation to the position indicated by the second object position data 92d with respect to a point, and stores (updates) the calculated position data as first object position data 92c. Here, as described above, the position of the earth object 112 (center point P) is the center of the point symmetry.

Figure 15:
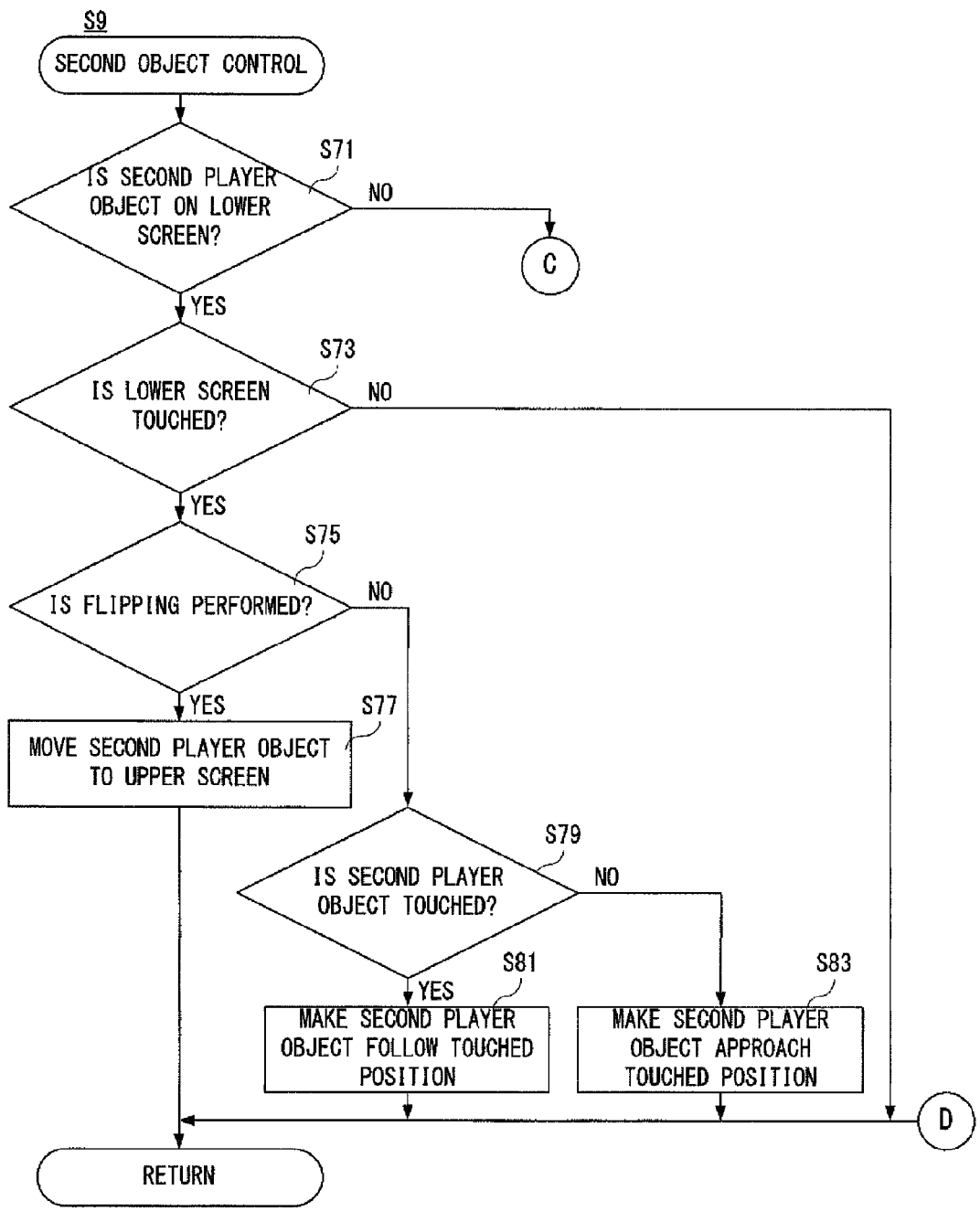
FIG. 15 is a flowchart showing one part of second object controlling processing by the CPU shown in FIG. 3.
Figure 16:
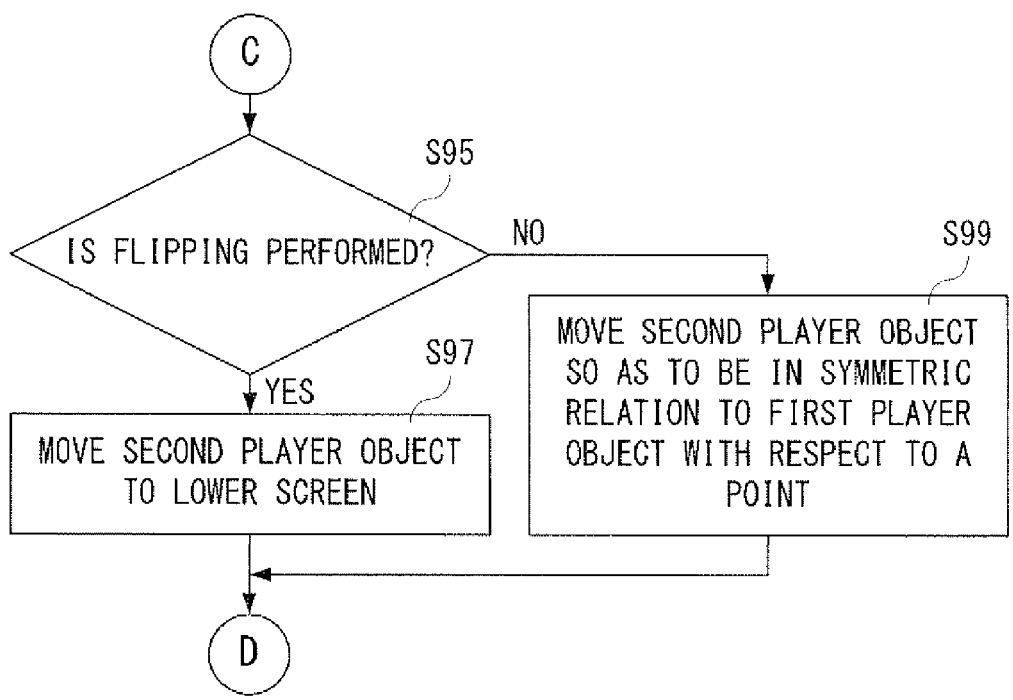
FIG. 16 is a flowchart showing the other part of the second object controlling processing by the CPU shown in FIG. 3 and sequel to FIG. 15.

FIG. 15 and FIG. 16 are flowcharts of the second object controlling processing shown in the step S9 in FIG. 12. The second object controlling processing is described below, but this is similar to the first object controlling processing and thus described simply.

As shown in FIG. 15, when starting the second object controlling processing, the CPU 50 determines whether or not the second player object 114 is on the lower screen 102 in a step S71. If "NO" in the step S71, that is, if the second player object 114 is on the upper screen 104, the process proceeds to a step S95 shown in FIG. 16. On the other hand, if "YES" in the step S71, that is, if the second player object 114 is on the lower screen 102, it is determined whether or not the lower screen 102 is touched in a step S73. If "NO" in the step S73, the process returns to the entire processing shown in FIG. 12.

On the other hand, if "YES" in the step S73, it is determined whether or not flipping is performed in a step S75. If "YES" in the step S75, the second player object 114 is moved to the upper screen 104 in a step S77, and the process returns to the entire processing. At this time, as shown in the aforementioned step S49, the first player object 110 is moved to the lower screen 102. On the other hand, if "NO" in the step S75, it is determined whether or not the second player object 114 is touched in a step S79.

If "YES" in the step S79, that is, if the second player object 114 is touched, the second player object 114 is made to follow the touched position in a step S81, and the process returns to the entire processing. On the other hand, if "NO" in the step S79, that is, if the second player object 114 is not touched, the second player object 114 is made to approach the touched position in a step S83, and the process returns to the entire processing.

As shown in FIG. 16, in the step S95, it is determined whether or not flipping is performed. If "YES" in the step S95, the second player object 114 is moved to the lower screen 102 in a step S97, and the process returns to the entire processing as shown in FIG. 15. At this time, as shown in the aforementioned step S39, the first player object 110 is moved to the upper screen 104. On the other hand, if "NO" in the step S95, the second player object 114 is moved so as to be in symmetric relation to the first player object 110 with respect to a point in a step S99, and the process returns to the entire processing.

Figure 17:
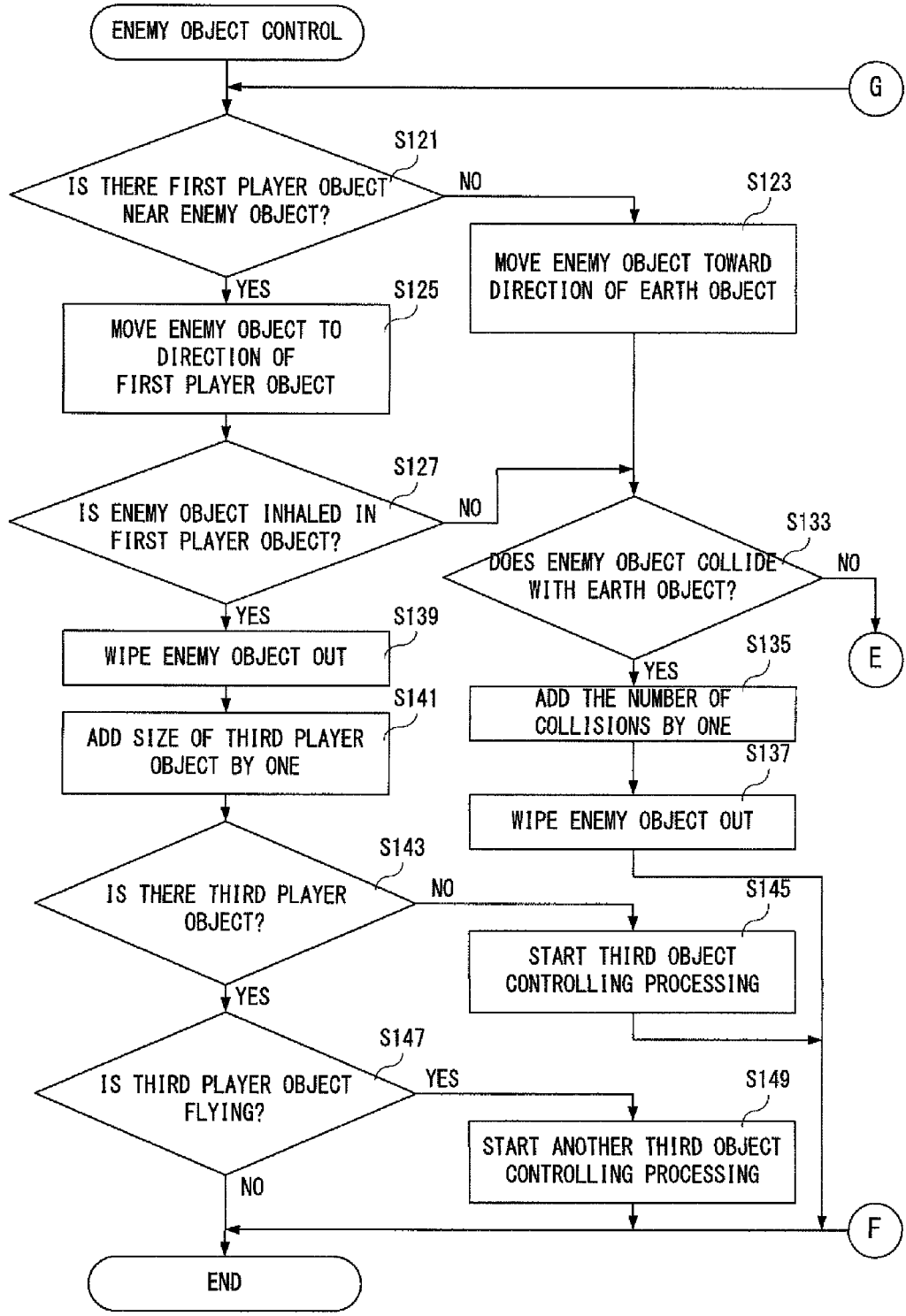
FIG. 17 is a flowchart showing one part of enemy object controlling processing by the CPU shown in FIG. 3.
Figure 18:
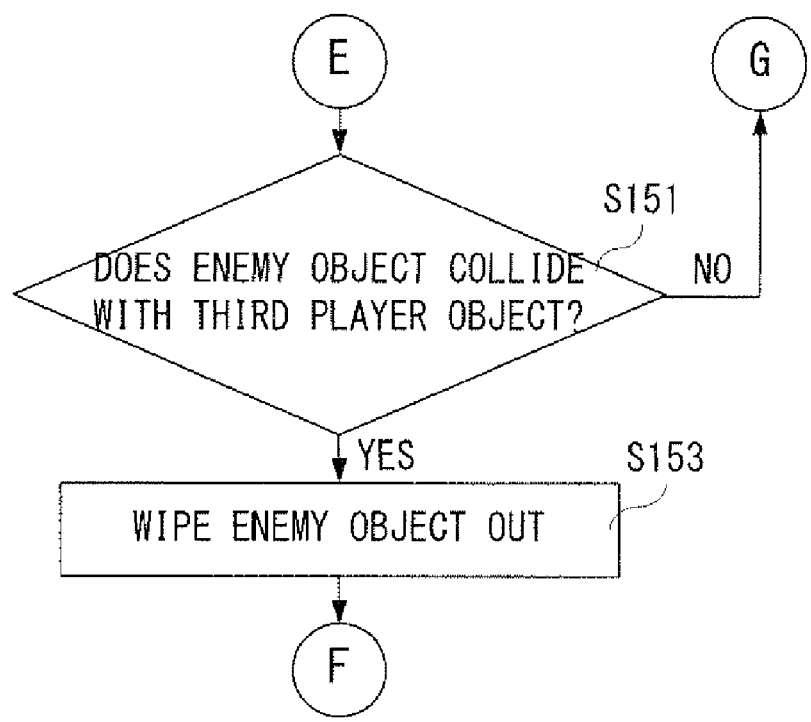
FIG. 18 is a flowchart showing the other part of the enemy object controlling processing by the CPU shown in FIG. 3, and sequel to FIG. 17.

FIG. 17 and FIG. 18 are flowcharts showing the enemy object controlling processing. The enemy object controlling processing is executed for each enemy object 116 making its appearance in the game space in parallel by a task different from the entire processing.

As shown in FIG. 17, when starting the enemy object controlling processing, the CPU 50 determines whether or not there is a nearby first player object 110 in a step S121. Here, the CPU 50 determines whether or not the distance between the first player object 110 and this enemy object 116 is shorter than the first predetermined distance. That is, it is determined whether or not the inhaling force by the first player object 110 is acted.

If "NO" in the step S121, that is, if the distance between the first player object 110 and this enemy object 116 is longer than the first predetermined distance, it is determined that there is no nearby first player object 110, the enemy object 116 is moved to the direction of the earth object 112 in a step S123, and the process proceeds to a step S133. That is, in the step S123, the CPU 50 moves the enemy object 116 toward the center point P at the velocity $v_e$. Here, the position of the earth object 112 (center point P) is fixedly decided and thus set in the game program.

On the other hand, if "YES" in the step S121, that is, if the distance between the first player object 110 and this enemy object 116 is shorter than the first predetermined distance, it is determined that there is a nearby first player object 110, and the enemy object 116 is moved toward the first player object 110 in a step S125. That is, the CPU 50 moves the enemy object 116 toward the position indicated by the first object position data 92c at the velocity $v_e$.

In a succeeding step S127, it is determined whether or not this enemy object 116 is inhaled in the first player object 110. Here, the CPU 50 determines whether or not the distance between the first player object 110 and this enemy object 116 is shorter than the second predetermined distance. If "NO" in the step S127, that is, if this enemy object 116 is not inhaled in the first player object 110, the process proceeds to the step S133.

In the step S133, it is determined whether or not this enemy object 116 collides with the earth object 112. Here, the CPU 50 executes normal hit determining processing (this holds true for steps S151, S177 described later). If "NO" in the step S133, that is, if this enemy object 116 does not collide with the earth object 112, the process proceeds to a step S151 shown in FIG. 18. On the other hand, if "YES" in the step S133, that is, if this enemy object 116 collides with the earth object 112, the number of collisions indicated by the collision count data 92f is added by one in a step S135, the enemy object 116 is wiped out in a step S137, and the enemy object controlling processing as to this enemy object 116 is ended.

Although a description in detail is omitted, a game screen in which the earth object 112 is impacted, or the enemy object 116 is broken to be wiped out is displayed, and sound effect or a melody representing thereof is output in the step S137.

Alternatively, if "YES" in the step S127, that is, if this enemy object 116 is inhaled in the first player object 110, the enemy object 116 is wiped out in a step S139, and the size of the third player object 118 indicated by the third object size data 92e is added by one in a step S141. Here, in the step S139, a game screen in which the enemy object 116 is inhaled in the first player object 110 to be wiped out is displayed, and sound effects or a melody representing thereof is output.

In a succeeding step S143, it is determined whether or not there is a third player object 118. Here, it is determined whether or not the size of the third player object 118 indicated by the third object size data 92e is equal to or more than 2, or there is the third player object 118 which is flying. If "NO" in the step S143, that is, if there is no third player object 118, third object controlling processing (see FIG. 19) described later is started in a step S145, and the enemy object controlling processing is ended.

On the other hand, if "YES" in the step S143, that is, if there is a third player object 118, it is determined whether or not this third player object 118 is flying in a step S147. If "NO" in the step S147, that is, if this third player object 118 is held by the second player object 114, the enemy object controlling processing is ended as it is. On the other hand, if "YES" in the step S147, that is, if this third player object 118 is flying, another third object controlling processing is started in a step S149, and the enemy object controlling processing is ended.

That is, in a case that the third player object 118 which has already been is flying, the first player object 110 inhales the enemy object 116 to thereby generate (produce) another third player object 118. Thus, the third object controlling processing as to the other third player object 118 is executed by a separate task.

Furthermore, as described above, if this enemy object 116 does not collide with the earth object 112, "NO" is determined in the step S133. And as shown in FIG. 18, it is determined whether or not this enemy object 116 collides with the third player object 118 in the step S151. If "NO" in the step S151, that is, if this enemy object 116 does not collide with the third player object 118, the process returns to the step S121 shown in FIG. 17 as it is. On the other hand, if "YES" in the step S151, that is, if this enemy object 116 collides with the third player object 118, the enemy object 116 is wiped out in a step S153, and the enemy object controlling processing is ended as shown in FIG. 17.

Here, in the step S153, a game screen in which the enemy object 116 collides with the third player object 118 to be destroyed and is wiped out is displayed, and sound effects or a melody representing thereof is output. At this time, by the third object controlling processing described later, a game screen in which the third player object 118 is destroyed to be wiped out and reduced is displayed, and sound effects or a melody thereof is output.

Figure 19:
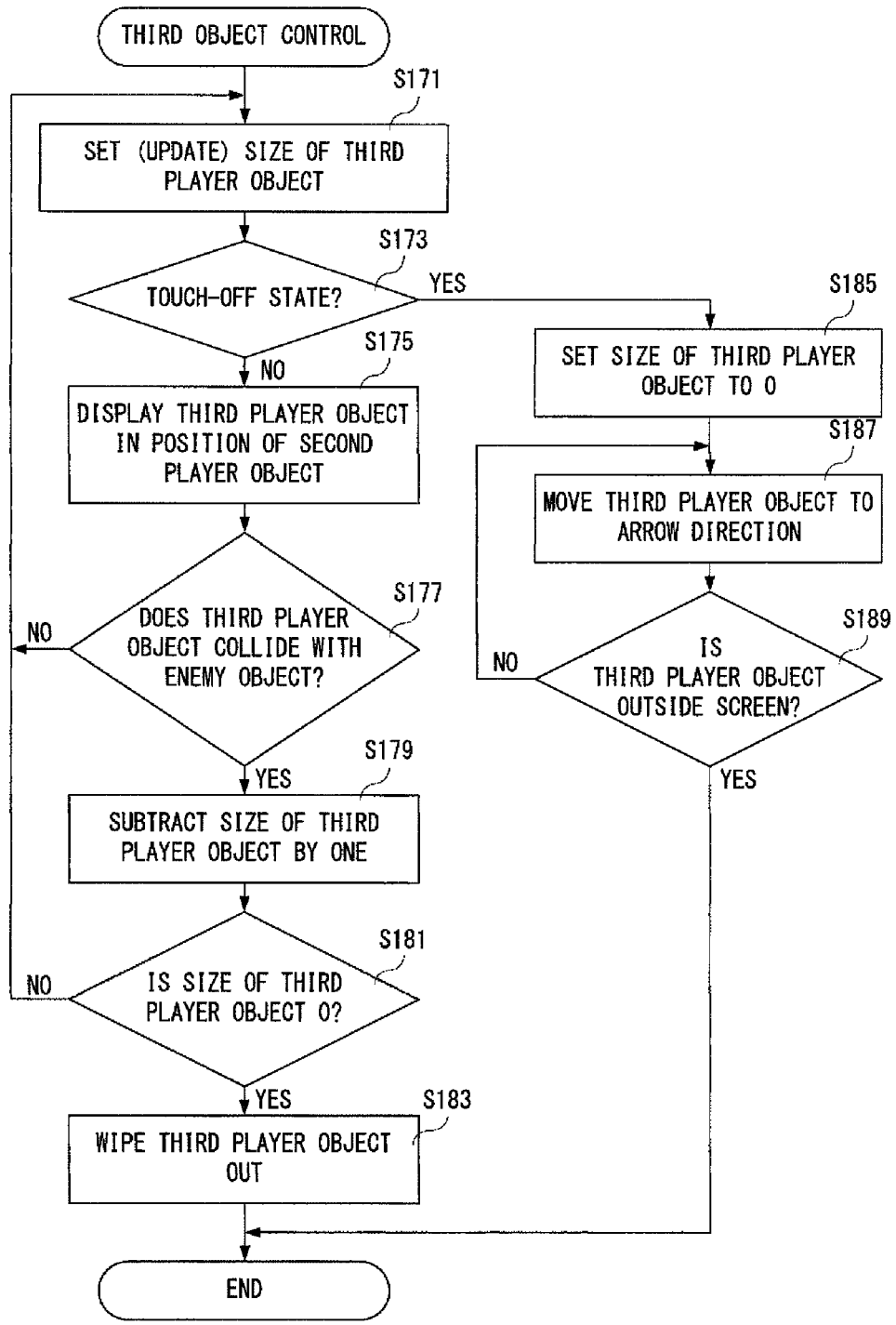
FIG. 19 is a flowchart showing third object controlling processing by the CPU shown in FIG. 3.

FIG. 19 is a flowchart showing the third object controlling processing. The third object controlling processing is executed by a task different from the task of the entire processing and the enemy object controlling processing for each third player object 118 generated (produced) in the game space in parallel.

As shown in FIG. 19, when starting the third object controlling processing, the CPU 50 sets (updates) the size of the third player object 118 indicated by the third object size data 92e in the step S171. Accordingly, at the beginning of the third object controlling processing, the third player object 118 is generated by the processing in a step S171.

In a next step S173, it is determined whether a touch-off state or not. Here, the CPU 50 determines whether or not a state that the coordinate data is stored changes to a state that the coordinate data is not stored with reference to the operation data buffer 92a. If "NO" in the step S173, that is, if not a touch-off state, this third player object 118 is displayed in the position of the second player object 114 indicated by the second object position data 92d in a step S175, and it is determined whether or not this third player object 118 collides with the enemy object 116 in a step S177.

If "NO" in the step S177, that is, if this third player object 118 does not collide with the enemy object 116, the process returns to the step S171 as it is. In this case, when the first player object 110 inhales the enemy object 116, for example, the third player object 118 is enlarged in the step S171, and this is displayed on the game screen and sound effects or a melody representing thereof is output. On the other hand, if "YES" in the step S177, that is, if this third player object 118 collides with the enemy object 116, the size of this third player object 118 indicated by the third object size data 92*e* is subtracted by one in a step S179.

Then, in a step S181, it is determined whether or not the size of this third player object 118 is 0. If "NO" in the step S181, that is, if the size of this third player object 118 is not 0, the process returns to the step S171 as it is. In this case, in the step S171, the third player object 118 is reduced, and a game screen in which it is impacted by the collision with the enemy object 116 is displayed and sound effects or a melody representing thereof is output.

On the other hand, if "YES" in the step S181, that is, if the size of this third player object 118 is 0, the third player object 118 is wiped out in a step S183, and the third object controlling processing as to the third player object 118 is ended.

Although a description in detail is omitted, in the step S183, a game screen in which the third player object 118 collides with the enemy object 116 to be destroyed and wiped out is displayed, and sound effects or a melody representing thereof is output.

Alternatively, if "YES" in the step S173, that is, if a touch-off state, the size of this third player object is set to 0 in a step S185. That is, the third object size data 92*e* is reset. This is for utilizing the third object size data 92*e* in order to control another third player object 118 generated anew. In a succeeding step S187, this third player object 118 is moved to the direction indicated by the designation image 122. Here, the third player object 118 is moved at the velocity $v_p$ calculated according to the equation 1.

Then, in a step S189, it is determined whether or not this third player object 118 is outside the screen. That is, the CPU 50 determines whether or not the position of this third player object 118 *k* is outside the game field 200. If "NO" in the step S189, that is, if this third player object 118 is not outside the screen, the process returns to the step S187. On the other hand, if "YES" in the step S189, that is, if this third player object 118 is outside the screen, the third object controlling processing is ended.

According to this embodiment, by interchanging the objects on the lower screen and the upper screen in response to a touch operation of the lower screen, desired objects can be moved between the upper screen and the lower screen, capable of improving operability.

Furthermore, according to this embodiment, in accordance with an operation of the object displayed on the lower screen, the object displayed on the upper screen is moved to be in symmetric relation with respect to a point, and therefore, it is possible to simultaneously operate the two objects. That is, it is possible to improve operability.

In addition, the object displayed on the upper screen is moved to keep in symmetric relation to the object displayed on the lower screen with respect to a point, and therefore, it is possible to make the difficulty level of the operation relatively high and prevent the player from being fed up with the game as much as possible.

Here, in this embodiment, the first player object and the second player object each is given a different function, but the second player object may be adapted to be an object imitating the black hole similar to the first player object. In such a case, the enemy object is inhaled on both of the upper screen and the lower screen to be wiped out. In such a case, the object need not be interchanged. Here, by providing difference in capability (inhaling forth) between the two player objects, the size of the enemy object is also changed to thereby interchange the player object as necessary.

Additionally, in this embodiment, the touch panel is provided only on the second LCD, but the touch panel may be provided on the first LCD as well. In such a case, the object displayed on the first LCD (upper screen) is moved with a touch operation, and according thereto, the object displayed on the second LCD (lower screen) can be moved to keep in symmetric relation to the object displayed on the upper screen with respect to a point. This makes it possible to directly move only the first player object or only the second player object with a touch operation, for example. Furthermore, in a case that the touch panel is provided on both of the LCDs, the object may be interchanged when a flipping operation toward the lower screen is performed on the upper screen as well. In this case, in response to the fact that the touched position is on the upper screen, and the change of the touched position in the plus direction of the Y-axis is equal to or more than the third predetermined distance within the predetermined time, the predetermined objects are interchanged.

In addition, in this embodiment, two objects are displayed (moved) to be symmetrical with respect to a point, but two objects may be displayed (moved) symmetrical with respect to a straight line passing through the center of the earth object and being in parallel with the X-axis. Whether a point-symmetrical display or a line-symmetrical display may be switched by the player, or changed depending on the phase or the difficulty level of the game.

Furthermore, in this embodiment, in a case that a flipping operation is performed upward (toward the first LCD), two objects are interchanged, but there is no need of being restricted thereto. For example, by operating the operation button, such as the L button, the R button, etc., two objects may be interchanged.

Moreover, in this embodiment, by using the touch panel, the object displayed on the lower screen is moved, but by using the cross key 20*a*, this object (or the object displayed on the upper screen) may be moved. In such a case as well, similar to the above-described embodiment, the object displayed on the upper screen (or the object displayed on the lower screen) is moved to keep in symmetric relation to the object displayed on the lower screen (or the object displayed on the upper screen) with respect to a point. Also, in a case that the cross key 20*a* is used, by pushing any one of the operation buttons 20*b*, 20*c*, 20*d*, 20*e*, the first player object may exert an inhaling forth. It should be noted that in a case that the cross key 20*a* is used, the movement is directly controlled without touching the player object, and therefore, the processing in the steps S41, S45 shown in FIG. 13 and the processing in the steps S79, S83 shown in FIG. 15 are deleted.

In addition, in this embodiment, assuming that the game apparatus is held in a state shown in FIG. 1 to play the game, the screen displayed on the first LCD called the upper screen, and the screen displayed on the second LCD is called the lower screen for the sake of convenience of description. However, in a state shown in FIG. 1, the player can play a game with the game apparatus upside down, rotated 90 degrees to the right (clockwise), rotated 90 degrees to the left (counterclockwise), or rotated by an arbitrary angle. Here, since the two-dimensional coordinate system of the game space is fixed, a flipping operation toward the first LCD when the first player object and the second player object are interchanged may be common to each case.

In addition, the configuration of the game apparatus need not be restricted to the configuration of the embodiment. For example, as to the display (LCD), one large LCD may be divided into two display areas to be used. Or, one camera or no camera may be appropriate.

Example embodiments of the present invention can also be applied to the game system in which respective processing for the game processing is distributedly processed by a plurality of computers, or the like.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program of a game apparatus having two display areas, said game program configured to cause a computer of said game apparatus to provide functionality comprising:
   an operation detector which detects an operation by a player;
   a displayer which displays a first player object on said one display area;
   a first player object controller which moves said first player object on the basis of a detection result by said operation detector, and
   an interchanger which interchanges the first player object and a second player object on the basis of a detection result by said operation detector by moving the first player object from the one display area to an other display area and moving the second player object from the other display area to the one display area.

2. A non-transitory storage medium storing a game program of a game apparatus having two display areas, said game program configured to cause a computer of said game apparatus to provide functionality comprising:
   an operation detector which detects an operation by a player;
   a displayer which displays a first object on said one display area;
   a first object controller which moves said first object on the basis of a detection result by said operation detector;
   an interchanger which displays said first object displayed on said one display area on said other display area on the basis of a detection result by said operation detector; and
   a second object controller which moves a second object different from said first object in accordance with a movement of said first object moved by said first object controller, wherein
   said displayer displays said second object on said other display area, and
   said interchanger displays said first object on said other display area and said second object on said one display area by interchanging said first object and said second object on the basis of a detection result by said operation detector.

3. The non-transitory storage medium according to claim 2, wherein
   said second object controller moves said second object according to an operation by said player, and said first object controller moves said first object according to the movement of said second object when said first object and said second object are interchanged by said interchanger.

4. The non-transitory storage medium according to claim 2, wherein
   said second object controller point-symmetrically moves said second object together with said first object moved by said first object controller.

5. A non-transitory storage medium storing a game program of a game apparatus having two display areas, said game program configured to cause a computer of said game apparatus to provide functionality comprising:
   an operation detector which detects an operation by a player;
   a first object controller which moves a first object displayed on said one display area on the basis of a detection result by said operation detector; and
   a second object controller which moves a second object different from said first object displayed on said other display area in accordance with a movement of said first object by said first object controller so that the first and second objects move symmetrically together about a reference point.

6. The non-transitory storage medium according to claim 5, wherein
   said second object controller point-symmetrically moves said second object together with said first object moved by said first object controller.

7. A non-transitory storage medium storing a game program of a game apparatus having two display areas, said game program configured to cause a computer of said game apparatus to provide functionality comprising:
   an operation detector which detects an operation by a player;
   a first object controller which moves a first object displayed on said one display area on the basis of a detection result by said operation detector;
   a second object controller which moves a second object different from said first object displayed on said other display area in accordance with a movement of said first object by said first object controller, said second object controller point-symmetrically moving said second object together with said first object moved by said first object controller; and
   an interchanger which displays said first object on said other display area and displays said second object on said one display area by interchanging said first object and said second object on the basis of a detection result by said operation detector, wherein
   said second object controller moves said second object according to an operation by said player, and said first object controller moves said first object according to the movement of said second object when said first object and said second object are interchanged by said interchanger.

8. The non-transitory storage medium storing a game program of a game apparatus having two display areas, wherein said game program is configured to cause a computer of said game apparatus to provide functionality comprising:
   an operation detector which detects an operation by a player on said one display area; and
   an object controller which moves an object displayed on said other display area so as to be in symmetric relation to a point on said one display area detected by said operation detector with respect to a reference point.

9. The non-transitory storage medium as in claim 8 wherein the reference point is positioned at the center of a displayed virtual game space.

10. The non-transitory storage medium as in claim 8 wherein the reference point is positioned at a point located between the two display areas, the two display areas being spatially separate from each other.

11. A game apparatus having two display areas, comprising:
   an operation detector which detects an operation by a player;
   a displayer which displays a first player object on said one display area;
   a player object controller which moves said first player object on the basis of a detection result by said operation detector; and
   an interchanger which interchanges a first player object and a second player object on the basis of a detection result by said operation detector by moving the first player object from the one display area to an other display area and moving the second player object from the other display area to the one display area.

12. A game apparatus having two display areas, comprising:
   an operation detector which detects an operation by a player;
   a first object controller which moves a first object displayed on said one display area on the basis of a detection result by said operation detector; and
   a second object controller which moves a second object different from said first object displayed on said other display area in accordance with the movement of said first object by said first object controller so that the first and second objects move symmetrically together about a reference point.

13. A game apparatus having two display areas, comprising:
   an operation detector which detects an operation by a player on said one display area; and
   an object controller which moves an object displayed on said other display area so as to be in symmetric relation to a point on said one display area detected by said operation detector with respect to a reference point.

14. The game apparatus as in claim 13 wherein the reference point is positioned at the center of a displayed virtual game space.

15. The game apparatus as in claim 13 wherein the reference point is positioned at a point located between the two display areas, the two display areas being spatially separate from each other.

16. A game system having two display areas, comprising:
   an operation detector which detects an operation by a player;
   a displayer which displays a first player object on said one display area;
   a player object controller which moves said first player object on the basis of a detection result by said operation detector; and
   an interchanger which interchanges the first player object and a second player object on the basis of a detection result by said operation detector by moving the first player object from the one display area to an other display area and moving the second player object from the other display area to the one display area.

17. A game system having two display areas, comprising:
   an operation detector which detects an operation by a player;
   a first object controller which moves a first object displayed on said one display area on the basis of a detection result by said operation detector; and
   a second object controller which moves a second object different from said first object displayed on said other display area in accordance with the movement of said first object by said first object controller so that the first and second objects move symmetrically together about a reference point.

18. A game system having two display areas, comprising:
   an operation detector which detects an operation by a player on said one display area; and
   an object controller which moves an object displayed on said other display area so as to be in symmetric relation to a point on said one display area detected by said operation detector with respect to a reference point.

19. The game system as in claim 18 wherein the reference point is positioned at the center of a displayed virtual game space.

20. The game system as in claim 18 wherein the reference point is positioned at a point located between the two display areas, the two display areas being spatially separate from each other.

21. A game controlling method of a game apparatus having two display areas, including steps of:
   (a) detecting an operation by a player;
   (b) displaying a first player object on said one display area;
   (c) moving, using a computer processor of the game apparatus, said first player object on the basis of a detection result by said step (a); and
   (d) interchanging the first player object and a second player object on said other display area on the basis of a detection result by said step (a) by moving the first player object from the one display area to an other display area and moving the second player object from the other display area to the one display area.

22. A game controlling method of a game apparatus having two display areas, including steps of:
   (a) detecting an operation by a player;
   (b) moving a first object displayed on said one display area on the basis of a detection result by said step (a); and
   (c) moving, using a computer processor of the game apparatus, a second object different from said first object displayed on said other display area according to a movement of said first object by said step (b) so that the first and second objects move symmetrically together about a reference point.

23. A game controlling method of a game apparatus having two display areas, including steps of:
   (a) detecting an operation by a player on said one display area; and
   (b) moving, using a computer processor of the game apparatus, an object displayed on said other display area so as to be in symmetric relation to a point on said one display area detected by said step (a) with respect to a reference point.

24. The game controlling method as in claim 23 wherein the reference point is positioned at the center of a displayed virtual game space.

25. The game controlling method as in claim 23 wherein the reference point is positioned at a point located between the two display areas, the two display areas being spatially separate from each other.

26. A game system comprising:
   an operation detector configured to detect an operation by a player;

a processing system, comprising at least one computer processor, the processing system being configured to:
    display a first object on one display area;
    moving said first object on the basis of a detection result by said operation detector, and
    display said first object displayed on said one display area on an other display area on the basis of a detection result by said operation detector; and
    move a second object different from said first object in accordance with a movement of said first object, wherein
said second object is displayed on said other display area, and
said first object on said other display area and said second object on said one display area are displayed by interchanging said first object and said second object on the basis of a detection result by said operation detector.

27. A game system comprising:
an operation detector which detects an operation by a player;
a processing system, comprising at least one computer processor, the processing system being configured to:
    move a first object displayed on one display area on the basis of a detection result by said operation detector; and
    move a second object different from said first object displayed on an other display area in accordance with a movement of said first object, said second object being point-symmetrically moved together with said first object; and
    display said first object on said other display area and said second object on said one display area by interchanging said first object and said second object on the basis of a detection result by said operation detector, wherein
said second object is moved according to an operation by said player, and said first object is moved according to the movement of said second object when said first object and said second object are interchanged.

* * * * *